(12) United States Patent
Shi et al.

(10) Patent No.: US 12,464,376 B2
(45) Date of Patent: Nov. 4, 2025

(54) NARROWBAND INTERNET OF THINGS SYSTEM AND SELF-OPTIMIZATION NETWORK INFORMATION TRANSMISSION METHOD THEREOF

(71) Applicant: LENOVO (BEIJING) LIMITED, Beijing (CN)

(72) Inventors: Jie Shi, Beijing (CN); Lianhai Wu, Beijing (CN); Haiming Wang, Beijing (CN); Zhi Yan, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 17/278,563

(22) PCT Filed: Nov. 13, 2018

(86) PCT No.: PCT/CN2018/115278
§ 371 (c)(1),
(2) Date: Mar. 22, 2021

(87) PCT Pub. No.: WO2020/097804
PCT Pub. Date: May 22, 2020

(65) Prior Publication Data
US 2021/0360438 A1    Nov. 18, 2021

(51) Int. Cl.
*H04W 24/02* (2009.01)
*H04W 8/24* (2009.01)
(Continued)

(52) U.S. Cl.
CPC ............ *H04W 24/02* (2013.01); *H04W 8/24* (2013.01); *G16Y 40/40* (2020.01); *H04W 24/10* (2013.01); *H04W 76/10* (2018.02)

(58) Field of Classification Search
CPC . H04W 24/02; H04W 24/10; H04W 36/0083; H04W 36/00835;
(Continued)

(56) References Cited

U.S. PATENT DOCUMENTS

2010/0214941 A1    8/2010    Hoole
2011/0149878 A1    6/2011    Ahmadi et al.
(Continued)

FOREIGN PATENT DOCUMENTS

CN    101801005 A    8/2010
CN    104936242 A    9/2015
(Continued)

OTHER PUBLICATIONS

International Searching Authority, "Notification of Transmittal of the International Search Report and the Written Opinion of the International Searching Authority, or the Declaration", PCT/CN2018/115278, Nov. 13, 2018, pp. 1-7.
(Continued)

*Primary Examiner* — Tom Y Chang
(74) *Attorney, Agent, or Firm* — Kunzler Bean & Adamson

(57) ABSTRACT

The present application relates to NB-IoT system and a self-optimization network information transmission method thereof. The NB-IoT system includes a base station and a user equipment. The base station transmits a configuration to the user equipment. The user equipment transmits a self-optimization network information to the base station based on the configuration. The configuration is for the user equipment to transmit the self-optimization network information as one of: transmitting the self-optimization network information to the base station after receiving a self-optimization network parameter from another base station; and
(Continued)

transmitting the self-optimization network information to the base station after a specific period.

20 Claims, 37 Drawing Sheets

(51) Int. Cl.
 *G16Y 40/40* (2020.01)
 *H04W 24/10* (2009.01)
 *H04W 76/10* (2018.01)
(58) Field of Classification Search
 CPC ............ H04W 52/0219; H04W 42/12; H04W 74/0833; H04W 84/18
 See application file for complete search history.

(56) References Cited

U.S. PATENT DOCUMENTS

| | | |
|---|---|---|
| 2016/0127985 A1 | 5/2016 | Kayargadde et al. |
| 2019/0132778 A1* | 5/2019 | Park ...................... H04W 24/10 |
| 2020/0037345 A1* | 1/2020 | Ryoo ................ H04W 74/0833 |
| 2020/0196327 A1* | 6/2020 | Zhang ................... H04W 72/21 |
| 2021/0076306 A1* | 3/2021 | Tamura ................... H04W 8/24 |
| 2021/0306892 A1* | 9/2021 | Li ......................... H04W 24/10 |
| 2022/0150741 A1* | 5/2022 | Teyeb ................... H04W 76/27 |
| 2023/0199617 A1* | 6/2023 | Höglund ............... H04W 72/23 370/329 |

FOREIGN PATENT DOCUMENTS

| | | | | |
|---|---|---|---|---|
| CN | 112771909 A | * | 5/2021 | ............ H04W 24/10 |
| JP | 20160063376 A | | 4/2016 | |
| WO | WO-2020029218 A1 | * | 2/2020 | ............ H04W 24/10 |
| WO | WO-2020061746 A1 | * | 4/2020 | ............ H04L 1/0038 |

OTHER PUBLICATIONS

Ericsson, Discussion on UE reporting the SON parameters, 3GPP TSG-RAN WG2 #104, R2-1817558, Nov. 12-16, 2018, pp. 1-4, Spokane, USA.

Nokia, Nokia Shanghai Bell, SON measurements and reporting for NB-IoT, 3GPP TSG-RAN WG2 Meeting #103bis, R2-1814412, Oct. 8-12, 2018, pp. 1-2, Chengdu, China.

Lenovo, Motorola Mobility, Consideration on SON in NB-IOT, 3GPP TSG-RAN WG2 Meeting #103bis, R2-1814764, Oct. 8-12, 2018, pp. 1-3, Chengdu, China.

* cited by examiner

NARROWBAND INTERNET OF THINGS SYSTEM AND SELF-OPTIMIZATION NETWORK INFORMATION TRANSMISSION METHOD THEREOF

TECHNICAL FIELD

The present disclosure generally relates to a network system and a self-optimization network information transmission method thereof, and especially to a Narrowband Internet of Things (NB-IoT) system and a self-optimization network information transmission method thereof:

BACKGROUND OF THE INVENTION

In a Long Term Evolution (LTE) network, procedures of self-organization network are introduced to automatically optimize the network. In particular, as for a request from a primary base station, a user equipment of the LTE network measures a secondary base station for obtaining Automatic Neighbor Relation (ANR) parameter associated with the secondary base station. Afterwards, the user equipment reports the ANR parameter associated with the secondary base station and network parameters of the user equipment to the primary base station. Accordingly, the primary base station is capable of optimizing the network based on the ANR parameter of the secondary base station and the network parameters of the user equipment.

Narrowband Internet of Things (NB-IoT) is a network technology developed based on Frequency Division Duplex LTE (FDD-LTE) network architecture wherein different devices can be connected in an NB-IoT network to communicate and exchange data with each other. However, it would not be a straightforward case to apply the procedures of self-organization network of the LTE network to the NB-IoT network.

BRIEF SUMMARY OF THE INVENTION

One embodiment of the present disclosure provides a self-optimization network information transmission method for a user equipment. The user equipment is used in a narrowband internet of things network system. The method includes: receiving, by the user equipment, a configuration from a first base station; and transmitting, by the user equipment, a self-optimization network information to the first base station based on the configuration. The configuration is for the user equipment to transmit the self-optimization network information as one of: transmitting the self-optimization network information to the first base station after receiving a self-optimization network parameter from a second base station, wherein the self-optimization network information includes the self-optimization network parameter of the second base station; and transmitting the self-optimization network information to the first base station after a specific period.

Another embodiment of the present disclosure provides a self-optimization network information transmission method for a base station. The base station is for communicating with a user equipment used in a narrowband internet of things network system. The method includes: transmitting, by the base station, a configuration to the user equipment; and receiving, by the base station, a self-optimization network information from the user equipment based on the configuration. The configuration is for the user equipment to transmit the self-optimization network information as one of: transmitting the self-optimization network information to the base station after the user equipment receives a self-optimization network parameter from another base station, wherein the self-optimization network information includes the self-optimization network parameter of the another base station; and transmitting the self-optimization network information to the base station after a specific period.

Yet another embodiment of the present disclosure provides a user equipment for use in a narrowband internet of things network. The user equipment includes a transceiver and a processor. The processor is coupled to the transceiver electrically, and configures the transceiver to: receiving a configuration from a first base station; and transmitting a self-optimization network information to the first base station based on the configuration. The processor, based on the configuration, configures the transceiver to transmit the self-optimization network information as one of: transmitting the self-optimization network information to the first base station after receiving a self-optimization network parameter from a second base station, wherein the self-optimization network information includes the self-optimization network parameter of the second base station; and transmitting the self-optimization network information to the first base station after a specific period.

Yet another embodiment of the present disclosure provides a base station for communicating with a user equipment used in a narrowband internet of things network system. The base station includes a transceiver and a processor. The processor is coupled to the transceiver electrically, and configures the transceiver to: transmit a configuration to the user equipment; and receive a self-optimization network information from the user equipment based on the configuration. The configuration is for the user equipment to transmit the self-optimization network information as one of: transmitting the self-optimization network information to the base station after the user equipment receives a self-optimization network parameter from another base station, wherein the self-optimization network information includes the self-optimization network parameter of the another base station; and transmitting the self-optimization network information to the base station after a specific period.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Figure 1A:
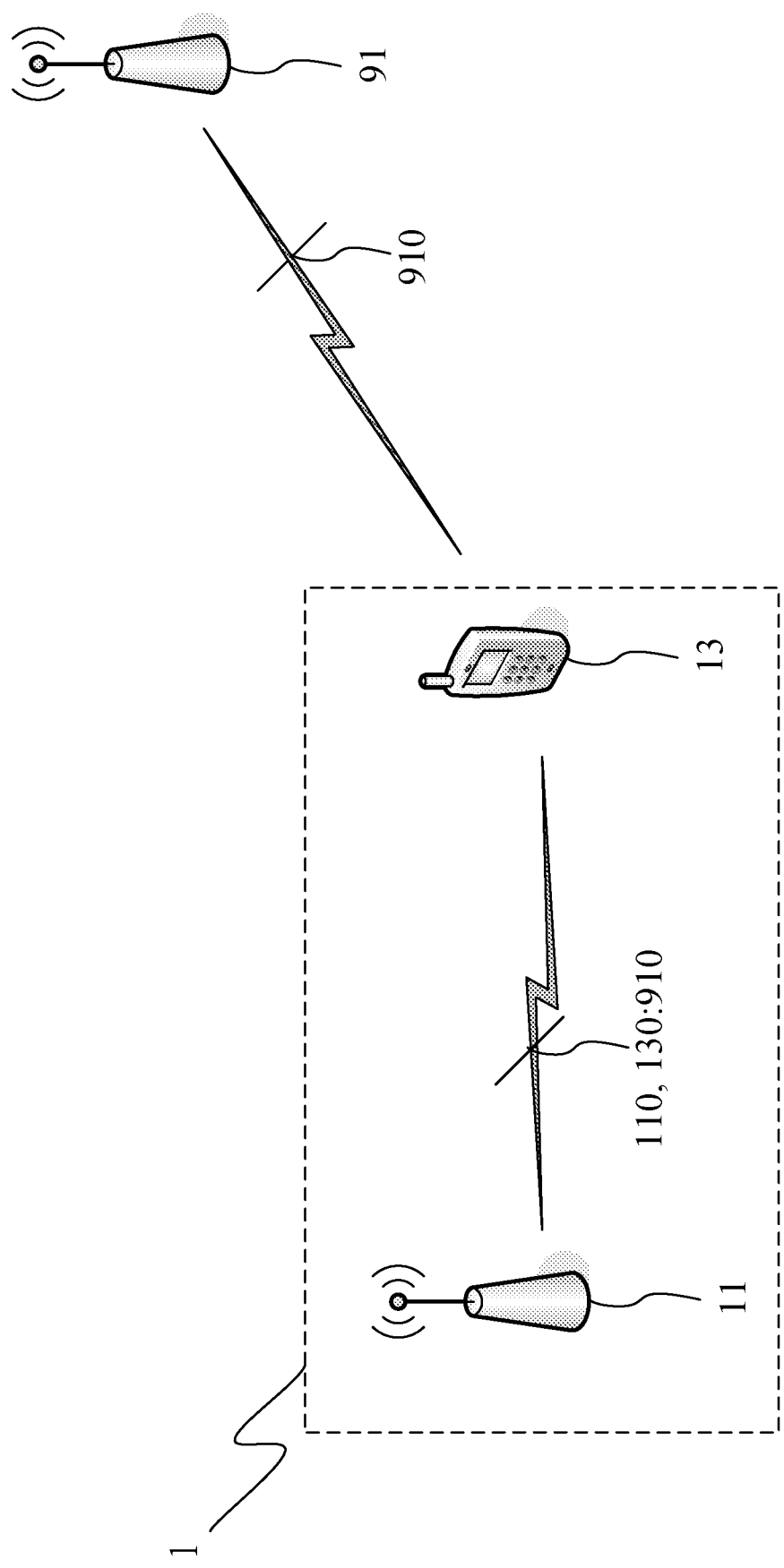
FIG. 1A is a schematic view of an NB-IoT network system according to an embodiment of the present disclosure.
Figure 1B:
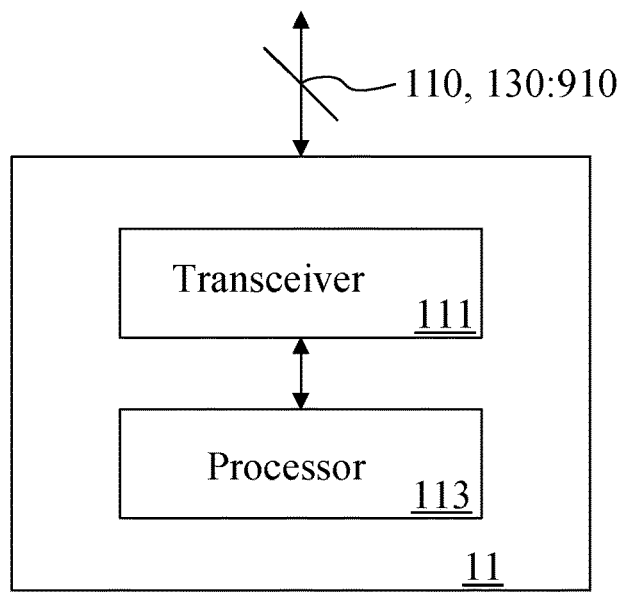
FIG. 1B is a block diagram of the base station according to an embodiment of the present disclosure.
Figure 1C:
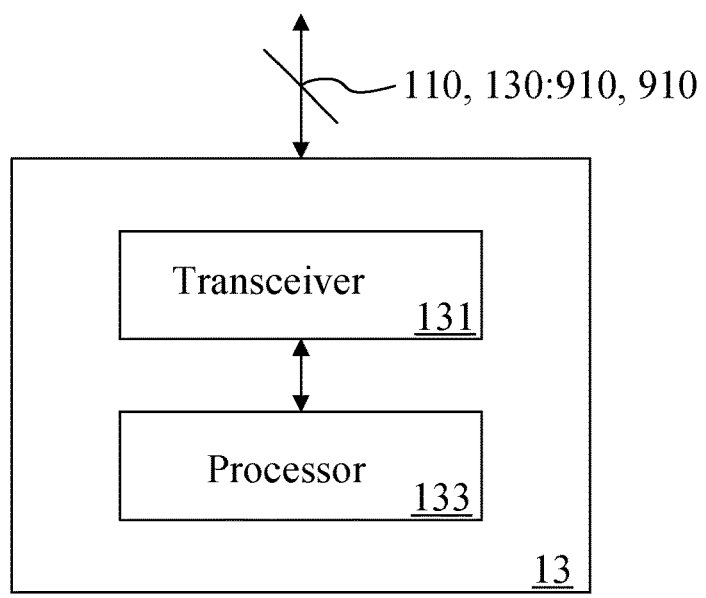
FIG. 1C is a block diagram of the user equipment according to an embodiment of the present disclosure

Please refer to FIG. 1A to FIG. 1C. FIG. 1A is a schematic view of a Narrowband Internet of Things (NB-IoT) network system 1 according to an embodiment of the present disclosure. The NB-IoT network system 1 includes a base station 11 and a user equipment 13. FIG. 1B is a block diagram of the base station 11 according to the embodiment of the present disclosure. The base station 11 includes a transceiver 111 and a processor 113. The transceiver 111 and the processor 113 are electrically coupled (e.g., electrically connected via bus).

FIG. 1C is a block diagram of the user equipment 13 according to the embodiment of the present disclosure. The user equipment 13 includes a transceiver 131 and a processor 133. The transceiver 131 and the processor 133 are electrically coupled (e.g., electrically connected via bus). The interactions between the individual elements will be further described hereinafter.

Before receiving any Self-Optimization Network (SON) information from the user equipment 13, the base station 11 needs to notify the user equipment 13 of the setting for transmitting SON information. In this embodiment, the processor 111 of the base station 11 configures the transceiver 113 to transmit a configuration 110 to the user equipment 13. On the other hand, the processor 133 of the user equipment 13 configures the transceiver 131 to receive the configuration 110.

The configuration 110 is used to configure the user equipment 13 to transmit SON information: (1) to the base station 11 after the user equipment 13 receives SON parameter from a base station 91; or (2) to the base station 11 after a specific period (not shown). In some embodiments, the configuration 110 can be transmitted with broadcast information via broadcast channel, or with Radio Resource Control (RRC) signal between the base station 11 and the user equipment 13.

Accordingly, the user equipment 13, based on the configuration 110, is capable of: (1) transmitting the SON information 130, which includes a SON parameter 910 of the base station 91, to the base station 11 after receiving the SON parameter 910 from the base station 91; or (2) transmitting the SON information 130 to the base station 11 after the specific period. After transmitting configuration 110 to the user equipment 13, the processor 113 of the base station 11 configures the transceiver 1 to receive the SON information 130 from the user equipment 13 based on the configuration 110.

In some embodiments, the user equipment 13 transmits the SON information 130 to the base station 11 immediately after receiving the SON parameter 910 from the base station 91. In other words, after receiving the SON parameter 910 from the base station 91, the user equipment 13 transmits the SON information 130 to the base station 11 at once. In some embodiments, the specific period is the duration of time that the user equipment 13 waits before transmitting user data. In some embodiments, the user equipment 13 transmits SON information with other data. In some embodiments, after obtaining the SON parameter 910 from the base station 91, the user equipment 13 waits the specific period before transmitting the SON information 130 to the base station 11. In some embodiments, after obtaining the SON parameter 910 from the base station 91, the user equipment 13 transmits the SON information 130 with other data to the base station 11. The SON information 130 may include the SON parameter 910 of the base station 91.

Figure 2:
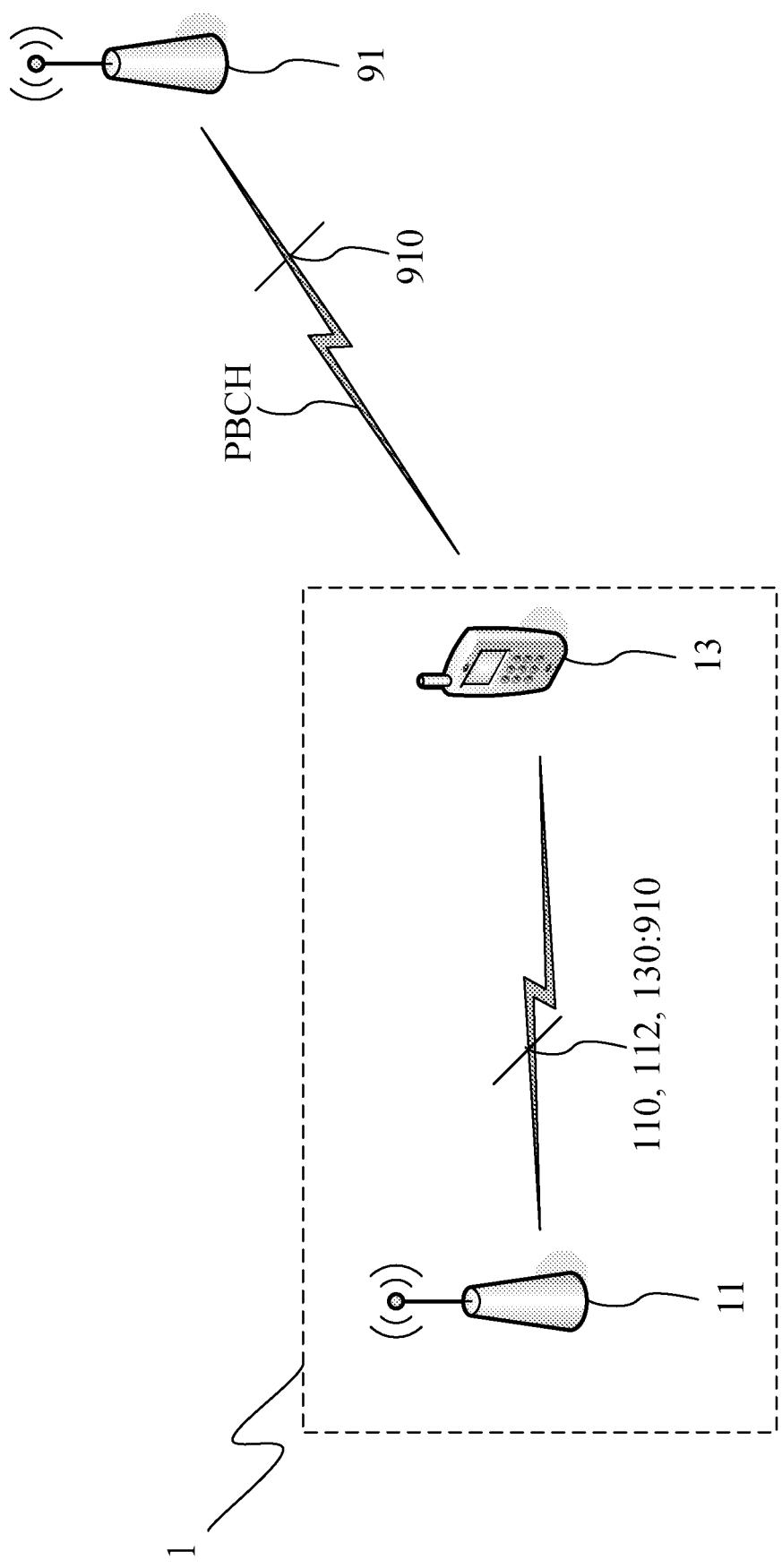
FIG. 2 is a schematic view of the NB-IoT network system according to an embodiment of the present disclosure.

Please refer to FIG. 2, which is a schematic view of the NB-IoT network system 1 according to an embodiment of the present disclosure. It should be noted that, the network architecture and the network environment of this embodiment are similar to those of the previous embodiment, so elements bearing the same reference numerals have same functions and will not be further described herein. This embodiment mainly describes the details of the transmission procedure.

In this embodiment, when the base station 11 needs to obtain SON information from the user equipment 13, the processor 113 of the base station 11 configures the transceiver 111 to transmit a SON information request 112 to the user equipment 13. Then, after receiving the SON information request 112, the processor 133 of the user equipment 13 configures the transceiver 131 to transmit the SON information 130 to the base station 11 based on the configuration 110. In other words, in this embodiment, after receiving the SON information request 112, the processor 133 of the user equipment 13 configures the transceiver 131 to transmit the SON information 130: (1) to the base station 11 after receiving the SON parameter 910 from the base station 91; or (2) transmitting the SON information 130 to the base station 11 after a specific period.

In some embodiments, the SON parameter 910 can be obtained from the base station 91. In detail, the processor 133 of the user equipment 13 configures the transceiver 131 to receive the SON parameter 910 from the base station 91. In some embodiments, the user equipment 13 listens to a Physical Broadcast Channel (PBCH) of the base station 91 for receiving the SON parameter 910 from the base station 91.

Figure 3:
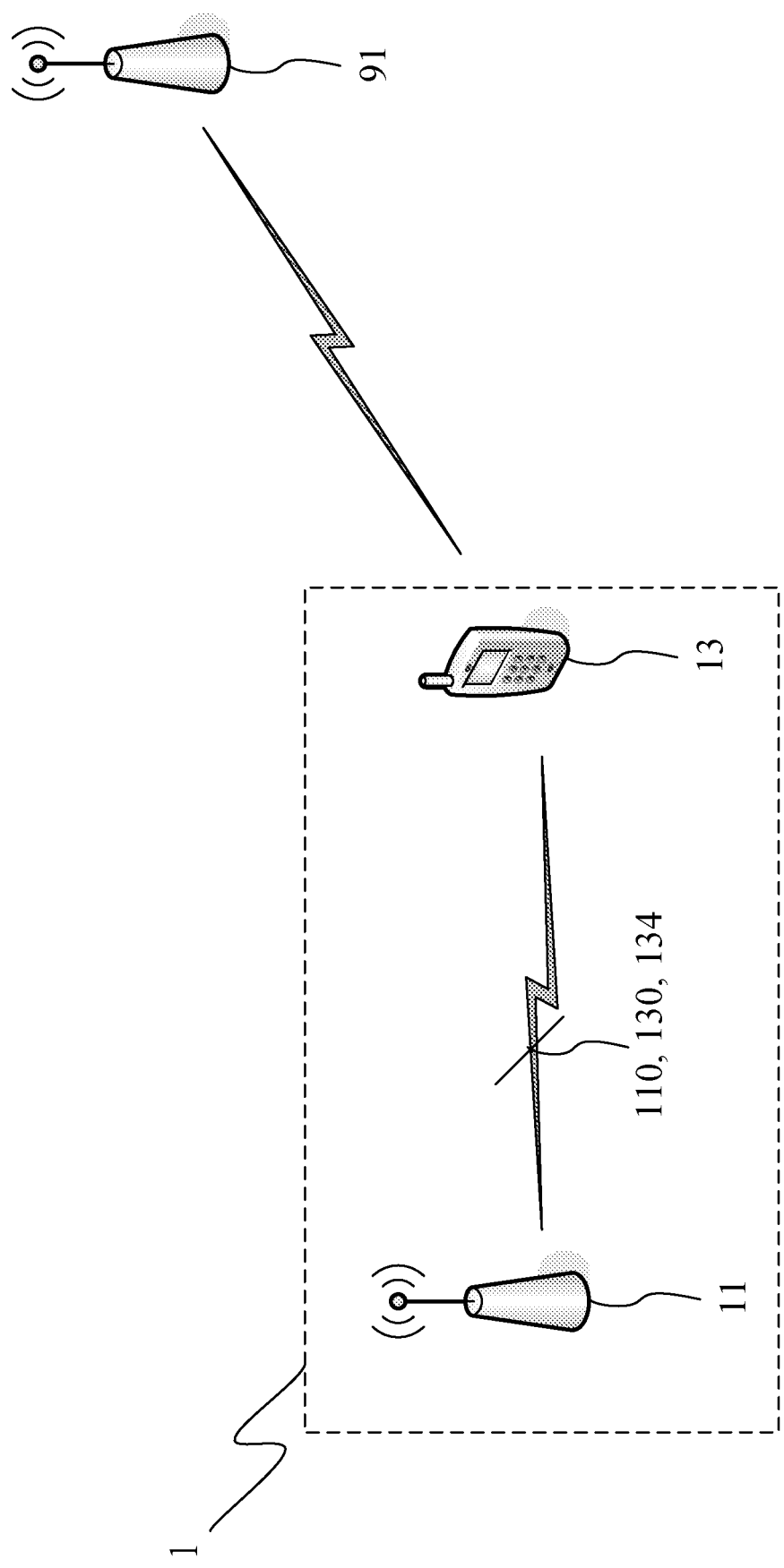
FIG. 3 is a schematic view of the NB-IoT network system according to an embodiment of the present disclosure.

Please refer to FIG. 3, which is a schematic view of the NB-IoT network system 1 according to an embodiment of the present disclosure. In this embodiment, before transmitting the SON information 130, the user equipment 13 should notify the base station 11 of the transmission of the SON information 130. In detail, in this embodiment, the base station 11 should be aware of the transmission of the SON information 130. Accordingly, when the SON information 130 is ready for transmission, the processor 133 of the user equipment 13 configures the transceiver 131 to transmit a SON information available message 134 to the base station 11 for notifying the base station 11 of the later transmission of the SON information 130.

The processor 113 of the base station 11 configures the transceiver 111 to receive the SON information available message 134 after being aware of the transmission of the SON information 130. Afterwards, the processor 133 of the user equipment 13 configures the transceiver 131 to transmit the SON information 130 to the base station 11 based on the configuration 110 and the transmission of the SON information available message 134, and then the processor 113 of the base station 13 configures the transceiver Ill to receive the SON information 130 based on the configuration 110 and the SON information available message 134.

Figure 4:
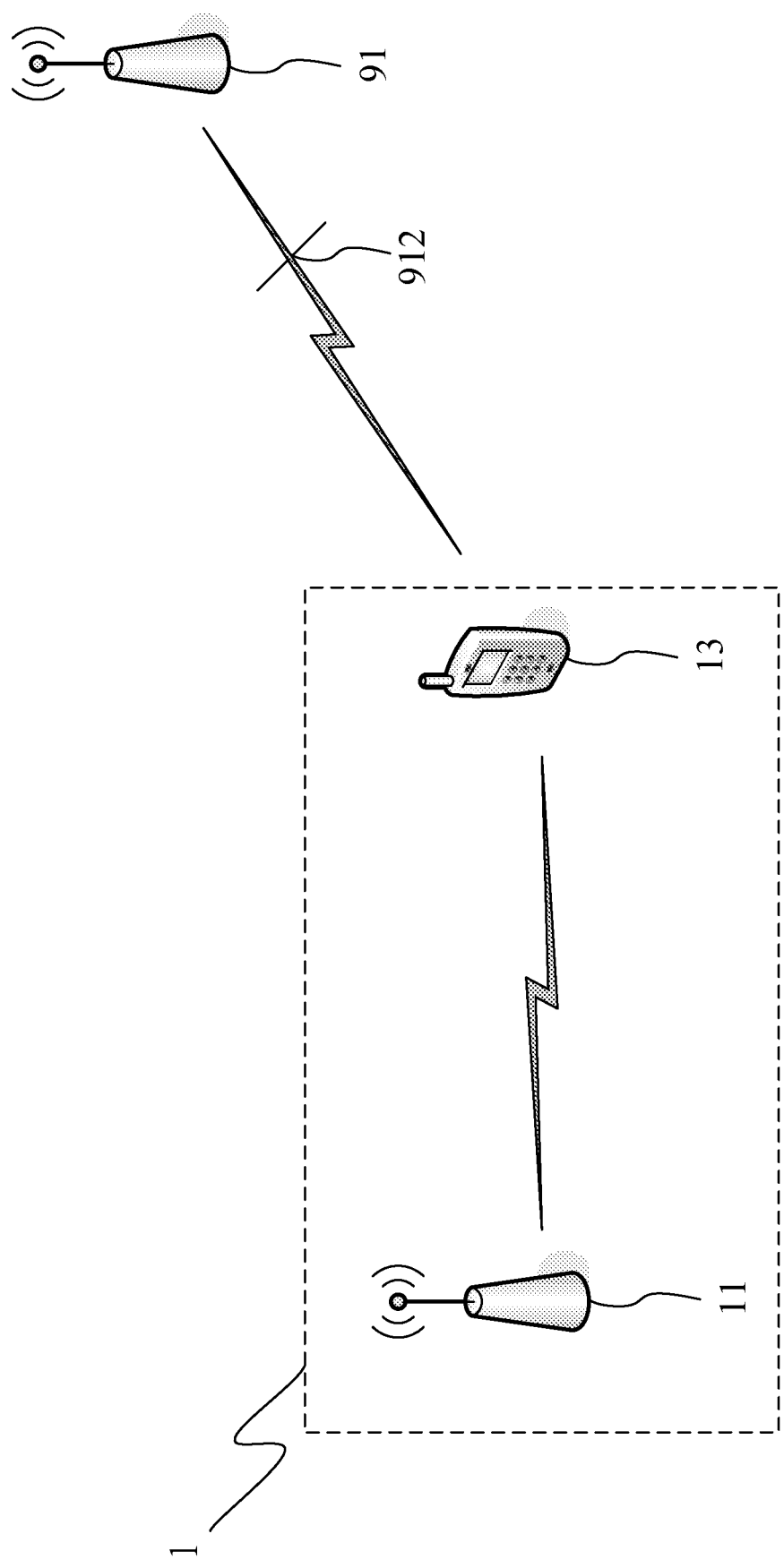
FIG. 4 is a schematic view of the NB-IoT network system according to an embodiment of the present disclosure.

Please refer to FIG. 4, which is a schematic view of the NB-IoT network system 1 according to an embodiment of the present disclosure. In this embodiment, before the base station 11 creates Automatic Neighbor Relation (ANR) item associated with a base station 91, the base station 11 should obtain some basic network information about the base station 91. In detail, the processor 133 of the user equipment 13 configures the transceiver 131 to receive a network information 912 from the base station 91, and then to transmit the network information 912 to the base station 11. Accordingly, the base station 11 is capable of creating an ANR item (not shown) associated with the base station 91 based on received network information 912.

In some embodiments, the network information 912 associated with the base station 91 includes a Physical Cell Identification (PCI) of the base station 91, an initial Cell Global Identification (CGI) of the base station 91, or a combination of PCI and CGI of the base station 91. In some embodiments, the PCI and the CGI of the base station 91 is one-time information transmitted to the base station 11 to create ANR item associated with the base station 91. In some embodiments, the acquisition of the basic information associated with the base station 91 should be achieved before the transmission of the configuration 110.

Figure 5A:
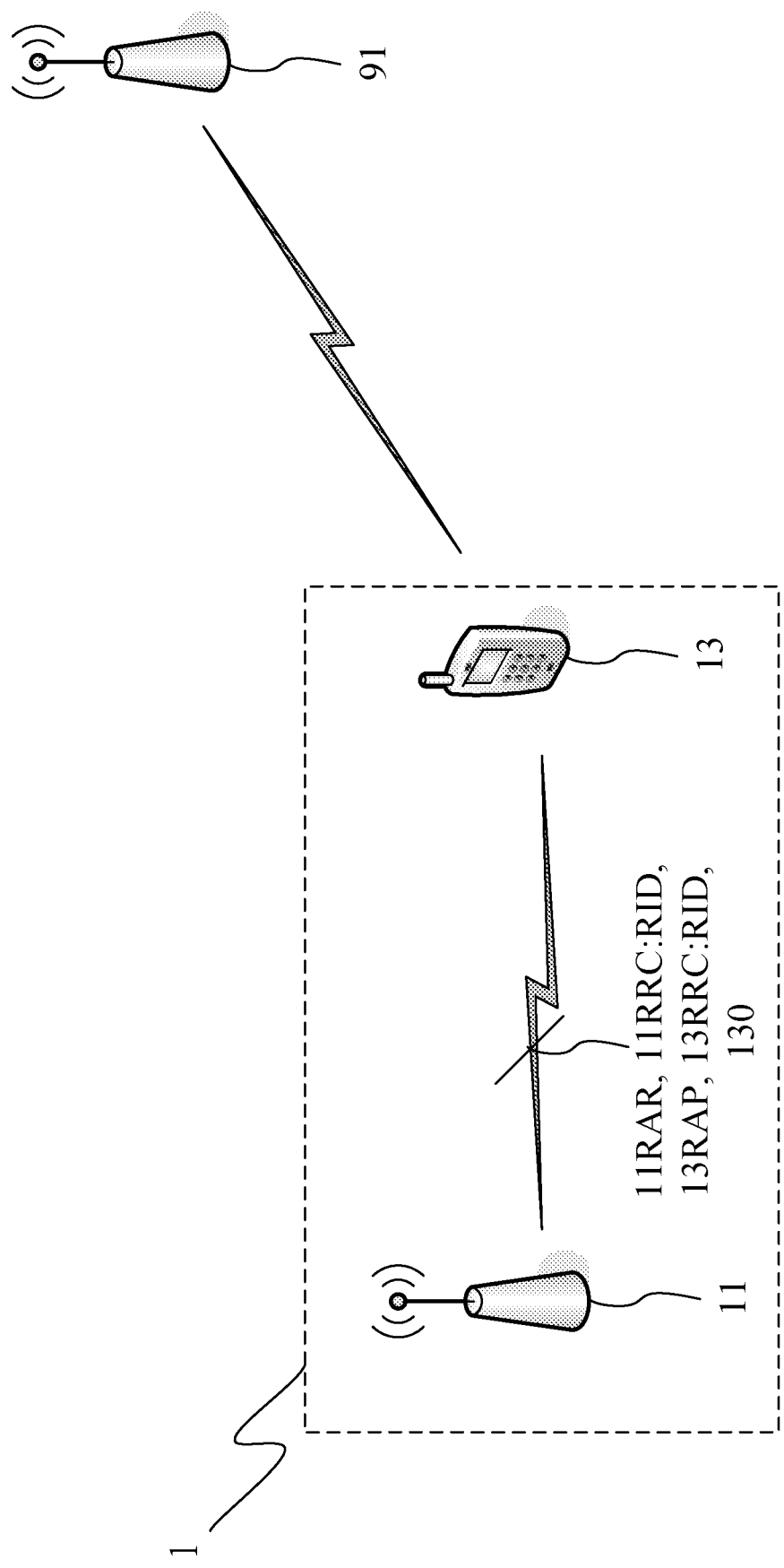
FIG. 5A is a schematic view of the NB-IoT network system according to an embodiment of the present disclosure.
Figure 5B:
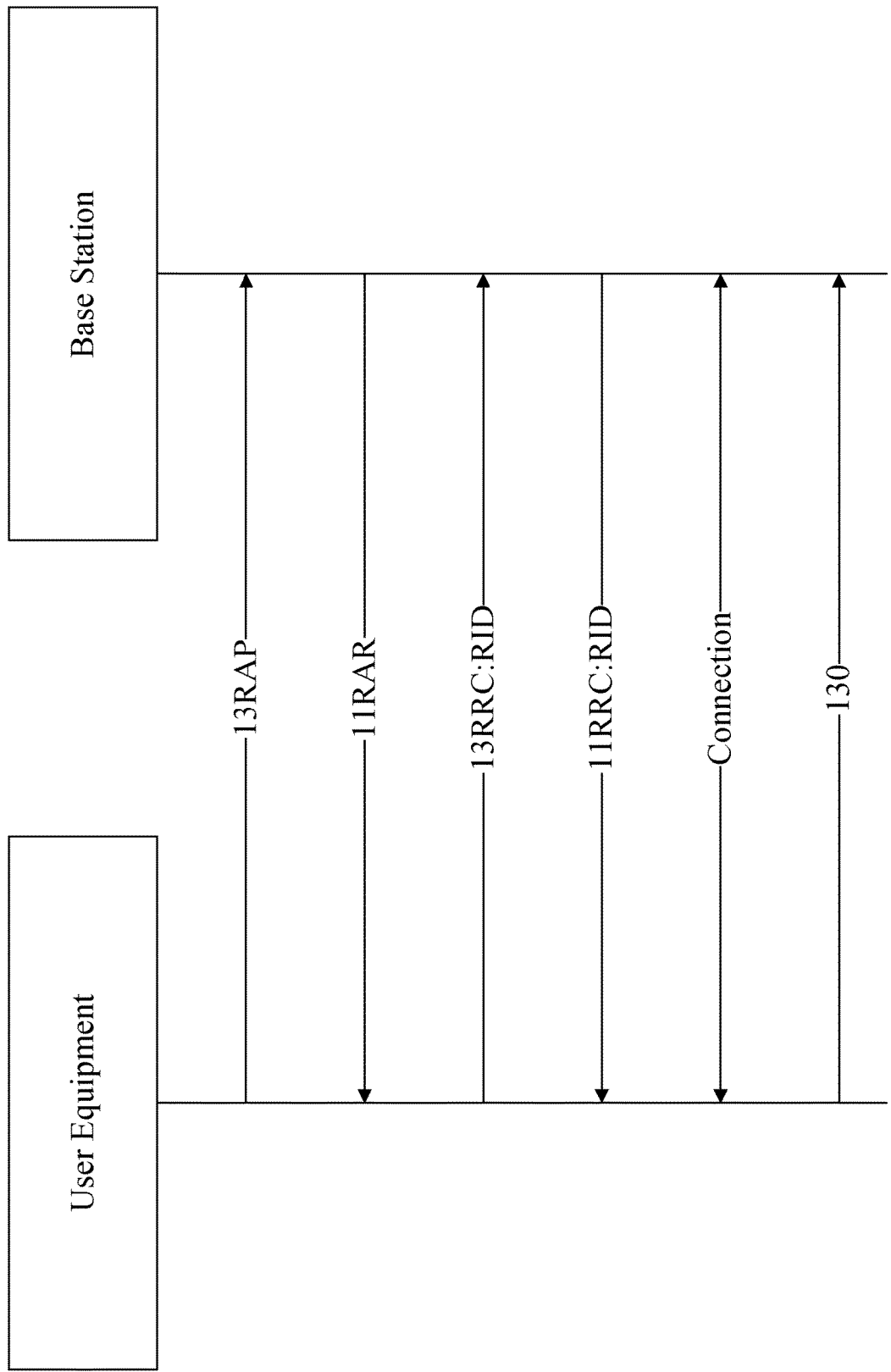
FIG. 5B is a schematic view of message transmission according an embodiment of the present disclosure.

Please refer to FIGS. 5A to 5B. FIG. 5A is a schematic view of the NB-IoT network system 1 according to an embodiment of the present disclosure. FIG. 5B is a schematic view of message transmission according the embodiment of the present disclosure. When the configuration 110 configures the user equipment 13 to transmit the SON information 130 to the base station 11, the transmission of the SON information 130 can be achieved via a regular Random Access (RA) procedure.

In detail, the processor 133 of the user equipment 13 configures the transceiver 131 to transmit an RA preamble 13RAP to the base station 11. The processor 113 of the base station 11 configures the transceiver 111 to receive the RA preamble 13RAP, and then to transmit an RA response 11RAR. Then, the processor 133 of the user equipment 13 configures the transceiver 13 to receive the RA response 11RAR, and then to transmit an RRC resume request 13RRC with a resume identification RID to the base station 11.

Next, the processor 113 of the base station 11 configures the transceiver 111 to receive the RRC resume request 13RRC with the resume identification RID, and then to transmit an RRC resume response 11RRC with the resume identification RID. Accordingly, the base station 11 and the user equipment 13 establish or resume a connection between the base station 11 and the user equipment 13 based on the RRC resume response 11RRC with the resume identification RID.

Accordingly, the processor 133 of the user equipment 13 configures the transceiver 131 to transmit the SON information 130 to the base station 11 via the connection. The processor 113 of the base station 11 configures the transceiver 111 to receive the SON information 130 via the connection. In some embodiments, the base station 11 and the user equipment 13 are associated in a regular RA procedure; therefore, an RRC resume request with resume identification can be used for resuming the connection between the base station 11 and the user equipment 13.

In some embodiments, the SON information 130 can be transmitted independently. In some embodiments, the SON information 130 can be transmitted with user data of the user equipment 13, wherein the specific period is the duration of time that the user equipment 13 waits before transmitting user data. In detail, the processor 133 of the user equipment 13 configures the transceiver 131 to transmit the SON information 130 with user data (not shown) to the base station 11 via the connection. The processor 113 of the base station 11 configures the transceiver 111 to receive the SON information 130 with the user data via the connection.

Figure 6A:
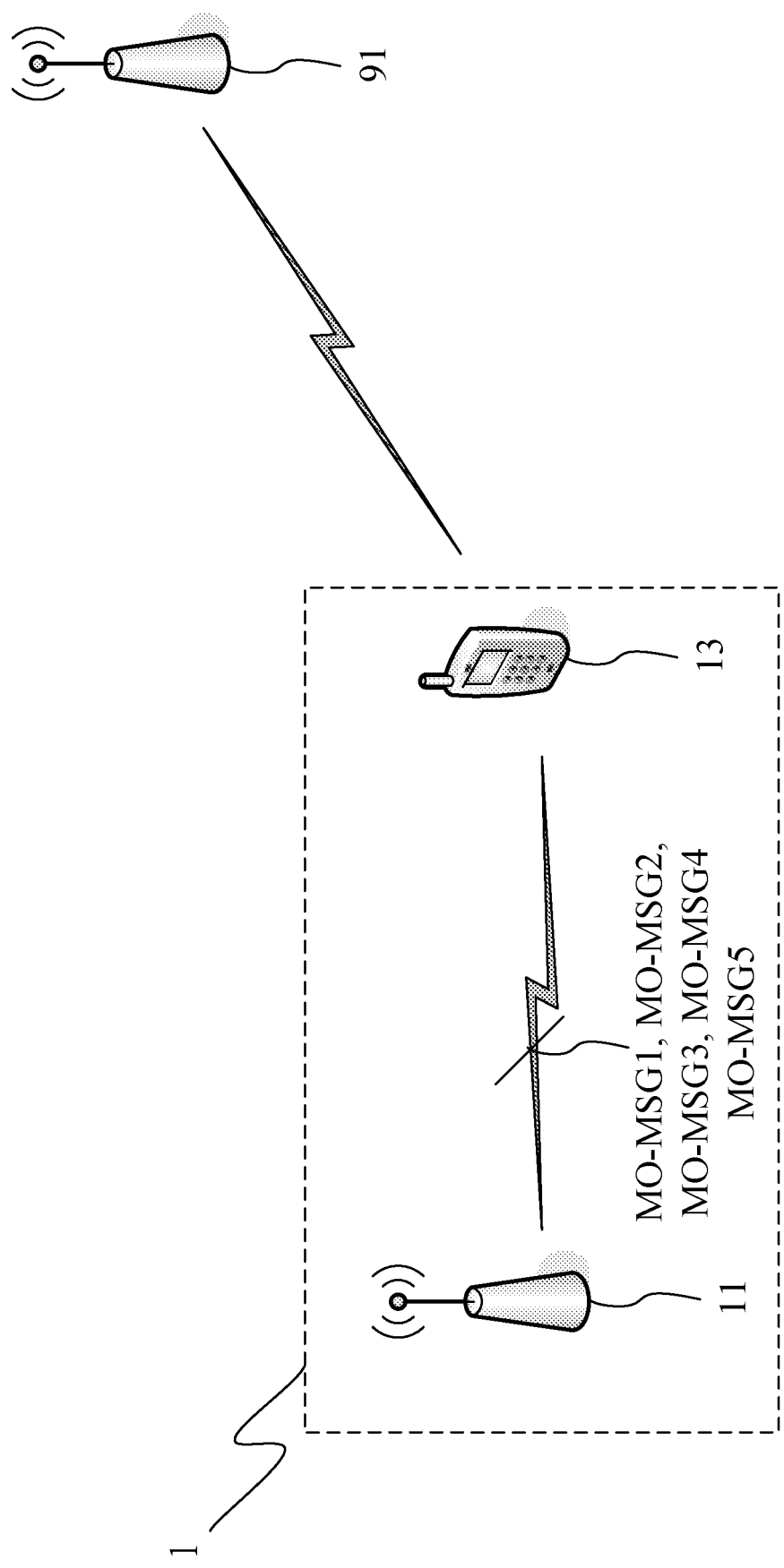
FIG. 6A is a schematic view of the NB-IoT network system according to an embodiment of the present disclosure.

Please refer to FIGS. 6A to 6F. FIG. 6A is a schematic view of the NB-IoT network system 1 according to an embodiment of the present disclosure. FIGS. 6B to 6F are schematic views of message transmission according different embodiments of the present disclosure. When the configuration 110 configures the user equipment 13 to transmit the SON information 130 to the base station 11 and the user equipment 13 is supported with Mobile Original Early Data Transmission (MO-EDT), the transmission of the SON information 130 can be achieved via an MO-EDT procedure.

In detail, in an MO-EDT procedure, the processor 133 of the user equipment 13 configures the transceiver 131 to transmit an MO-EDT transmission preamble MO-MSG1 to the base station 11. The processor 113 of the base station 11 configures the transceiver 111 to receive the MO-EDT transmission preamble MO-MSG1, and then to transmit an MO-EDT transmission response MO-MSG2 to the user equipment 13.

The processor 133 of the user equipment 13 configures the transceiver 131 to receive the MO-EDT transmission response MO-MSG2, and then to transmit an EDT message MO-MSG3 to the base station 11. The processor 113 of the base station 11 configures the transceiver 11I to receive the EDT message MO-MSG3, and then to transmit an EDT response MO-MSG4 to the user equipment 13.

Figure 6B:
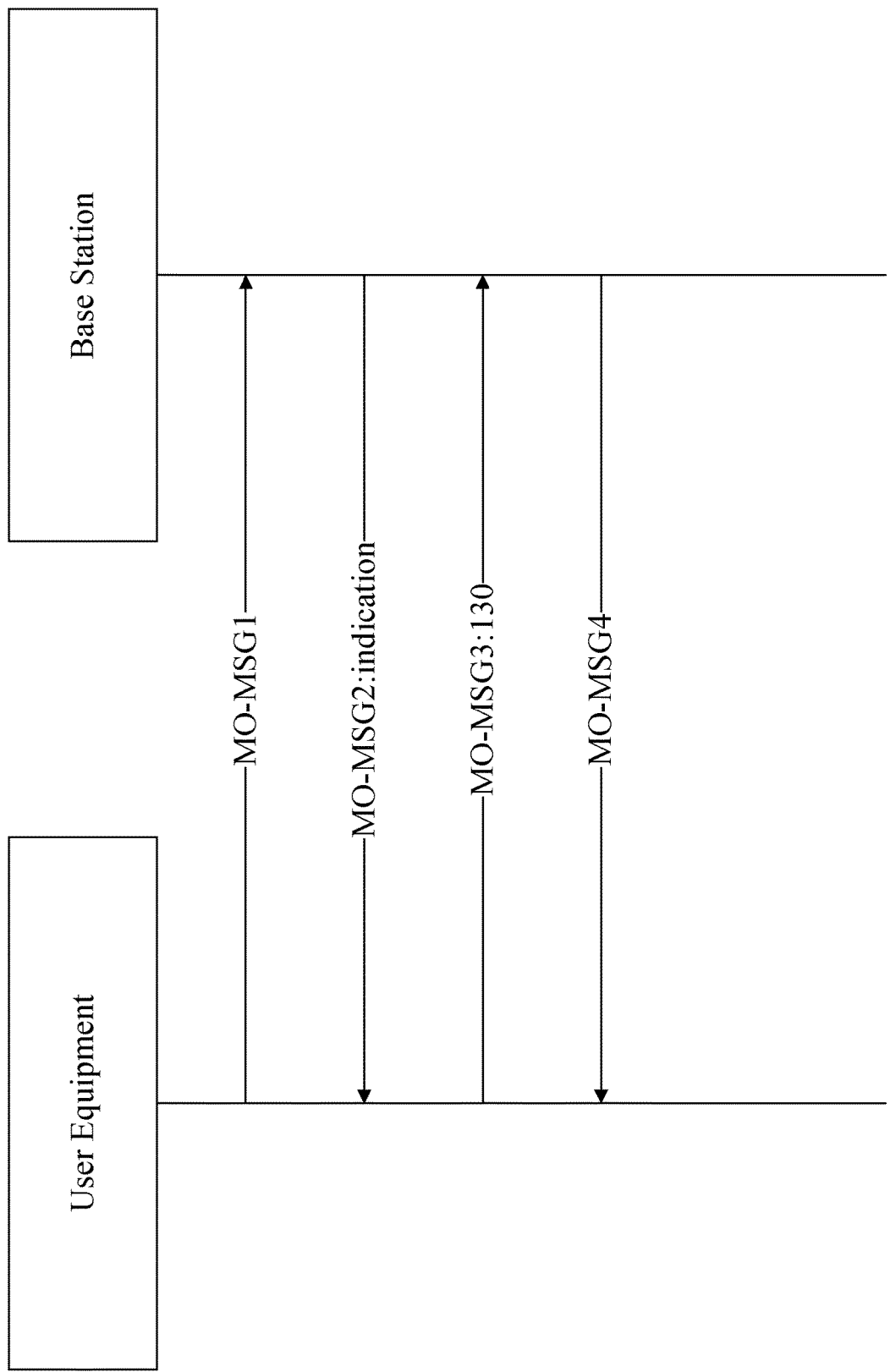
FIGS. 6B to 6F are schematic views of message transmission according different embodiments of the present disclosure.

Referring to FIG. 6B, in some embodiments, an indication can be embedded in the MO-EDT transmission response MO-MSG2, wherein the indication is used for indicating to the user equipment 13 that the SON information 130 should be embedded in the EDT message MO-MSG3. In some embodiments, the SON information 130 is embedded in the EDT message MO-MSG3 independently. In some embodiments, the EDT message MO-MSG3 further includes user data (not shown), and the SON information 130 is transmitted with the user data via the EDT message MO-MSG3.

Figure 6C:
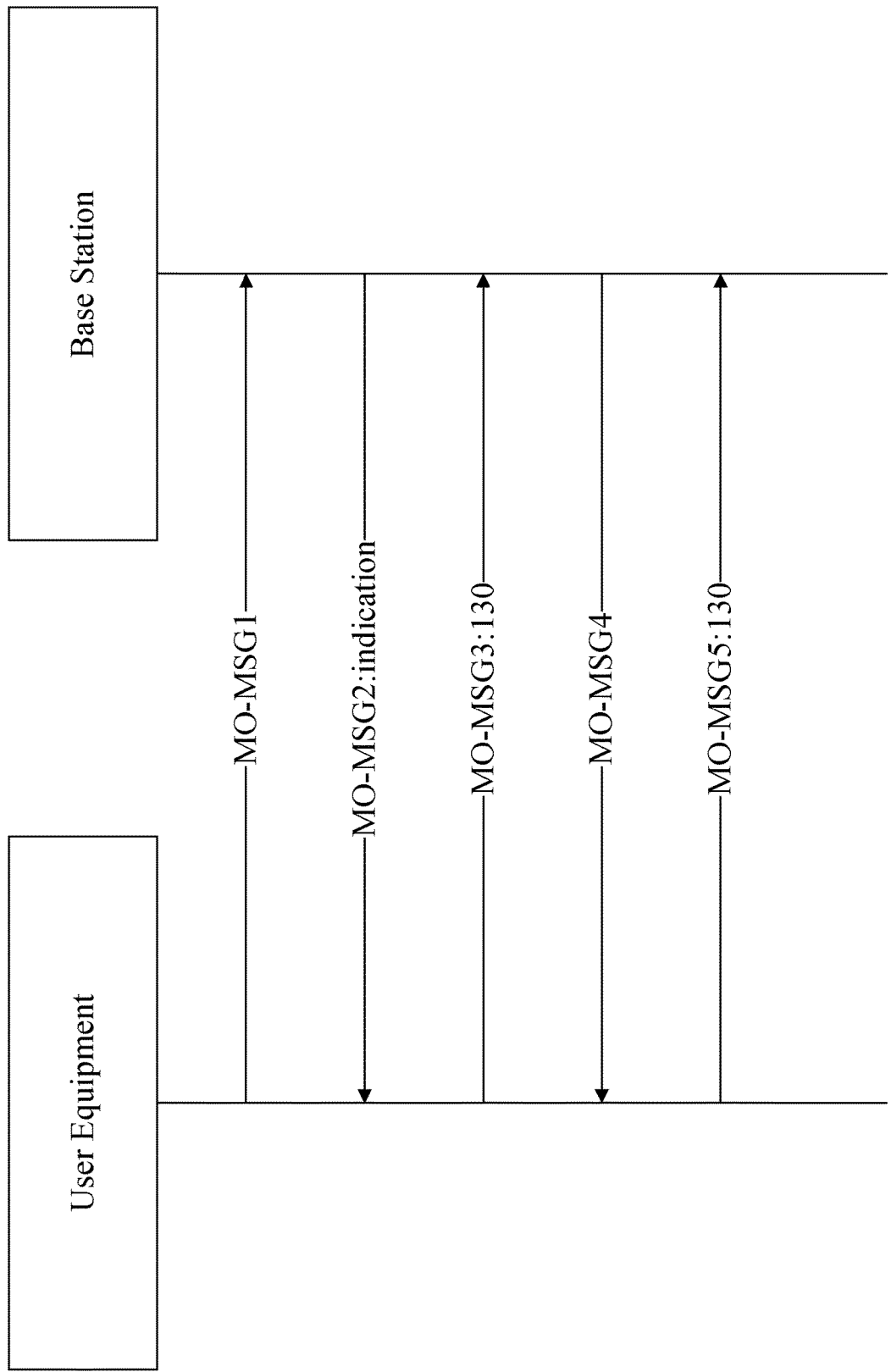

Referring to FIG. 6C, in some embodiments, an EDT message MO-MSG5 is introduced by the user equipment 13 to transmit overflow data. In these embodiments, the size of the SON information 130 is greater than the size of the EDT message MO-MSG3. Accordingly, an indication can be embedded in MO-EDT transmission response MO-MSG2. The indication is used for indicating to the user equipment 13 that: (1) the SON information 130 should be divided into two part—a first part and a second part; and (2) the first part of the SON information 130 should be embedded in the EDT message MO-MSG3 and the second part should be embedded in the EDT message MO-MSG5.

Figure 6D:
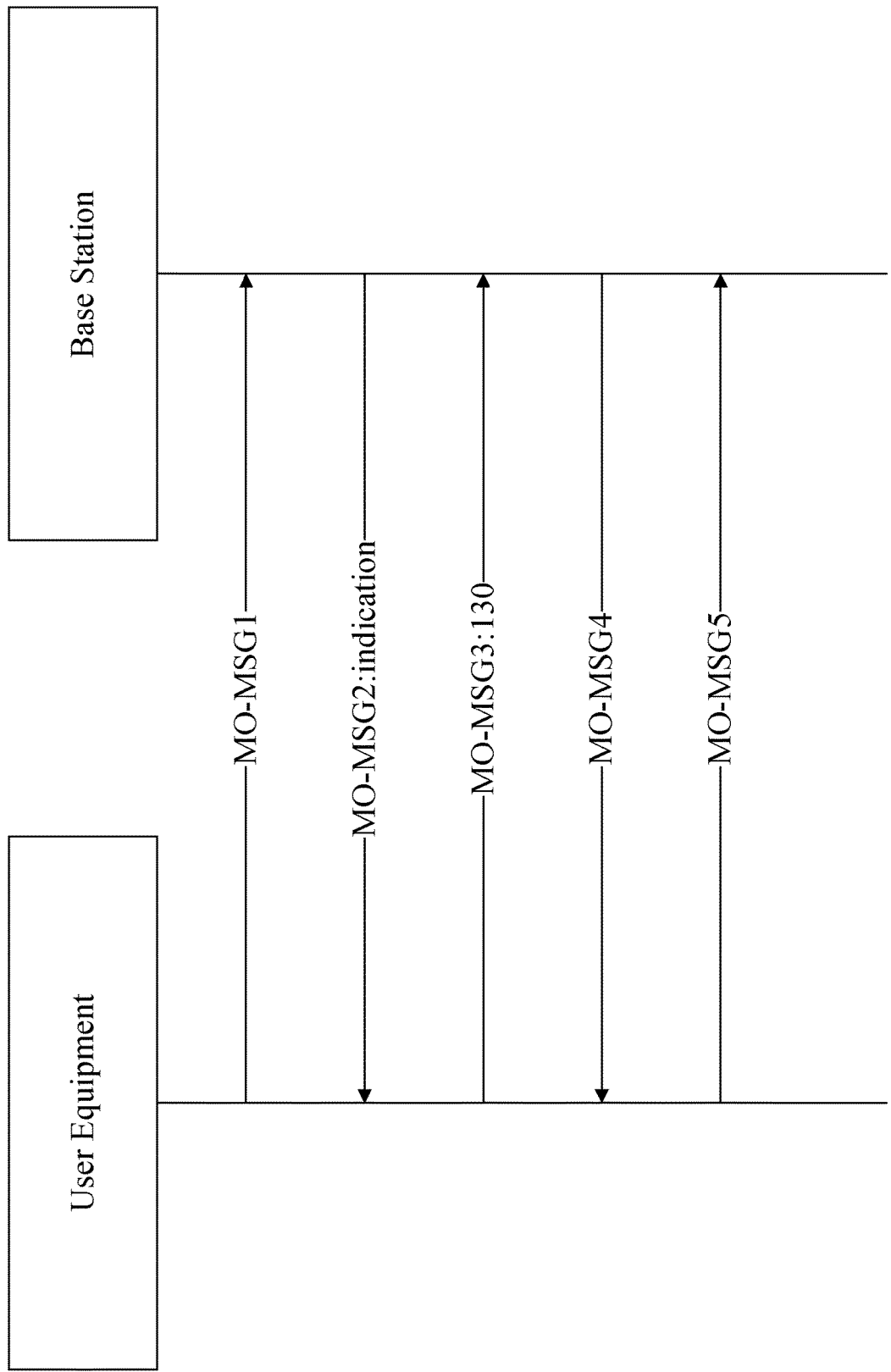
Figure 6E:
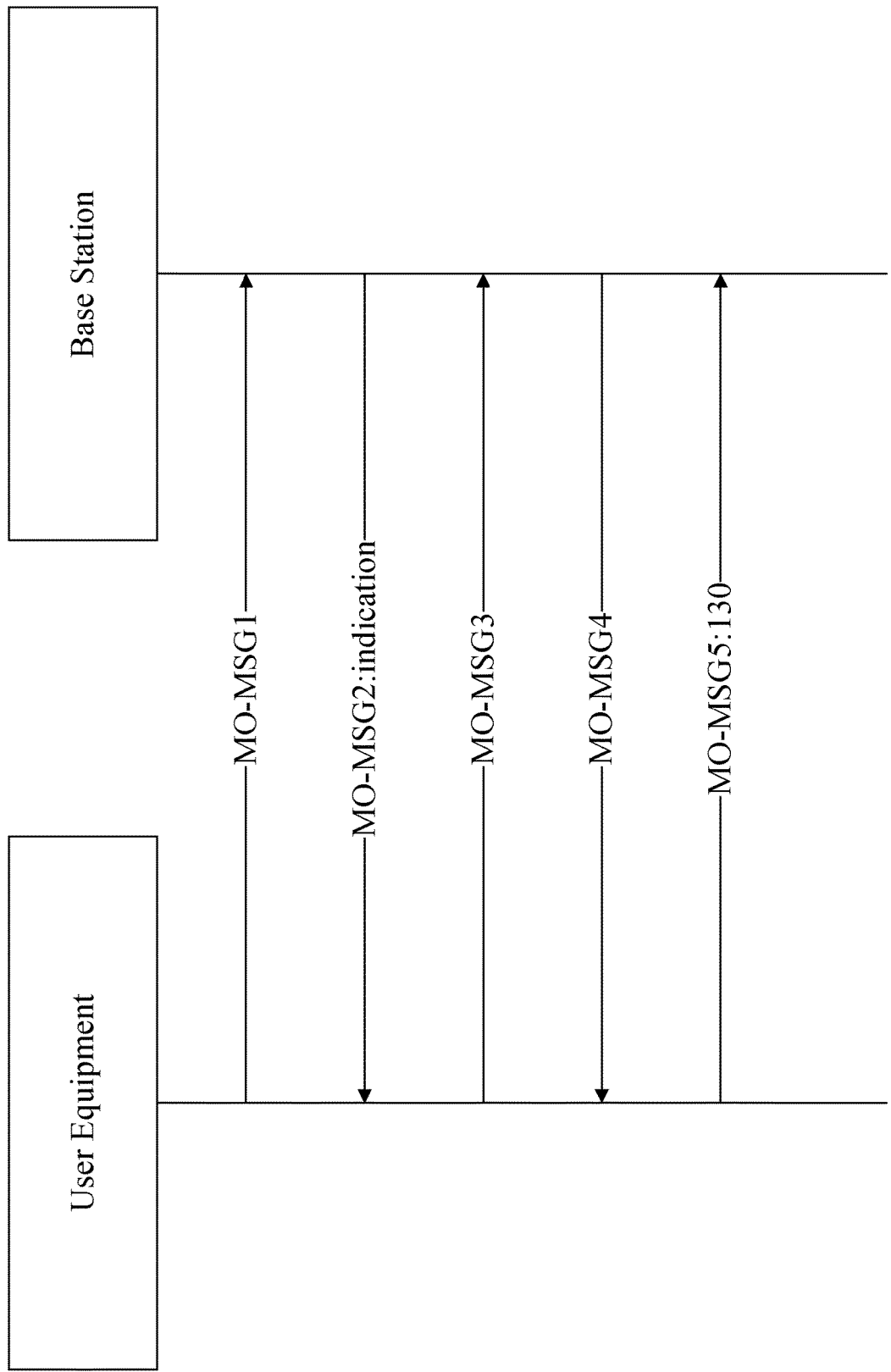

Referring to FIGS. 6D to 6E, in some embodiments, the EDT message MO-MSG5 is introduced by the user equipment 13 to transmit remaining data while the size of user data is greater than the size of the EDT message MO-MSG3. In these embodiments, an indication can be embedded in the MO-EDT transmission response MO-MSG2, and the indication is used for indicating to the user equipment 13 that the SON information 130 should be embedded in the EDT message MO-MSG3 with the user data or embedded in the EDT message MO-MSG5 with the remaining data.

Figure 6F:
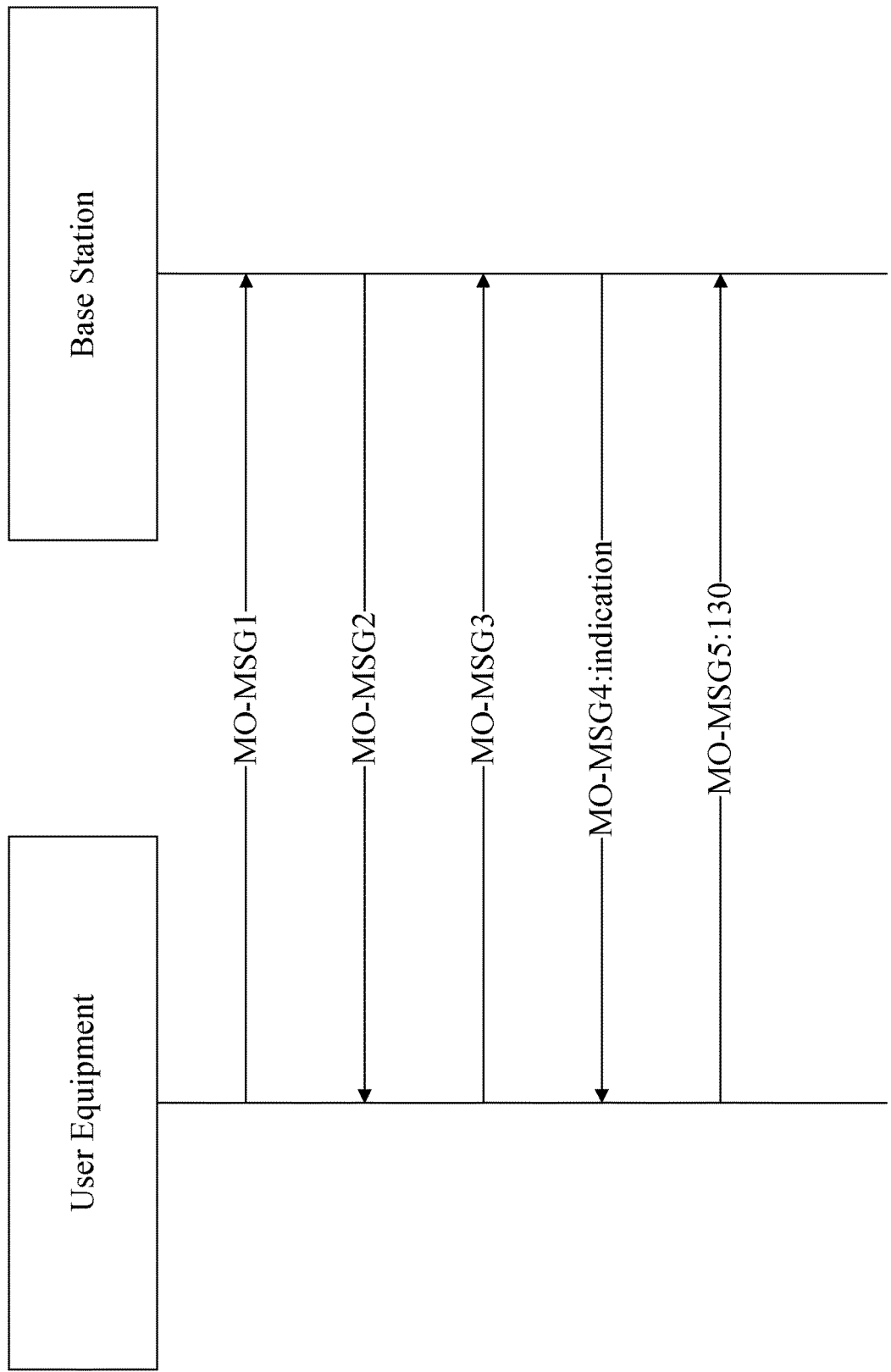

Referring to FIG. 6F, in some embodiments, while the EDT message MO-MSG5 is introduced, an indication can be embedded in EDT response MO-MSG4, wherein the indication is used for indicating to the user equipment 13 that the SON information 130 should be embedded in the EDT message MO-MSG5.

In some embodiments, the user equipment 13 could embed only SON information available message within the EDT message MO-MSG.3, for indicating that the SON information 130 is ready. Then, the base station 11 and the user equipment 13 recover connected status by the EDT response MO-MSG4, and the user equipment 13 transmits the SON information 130 by the EDT message MO-MSG5.

Figure 7A:
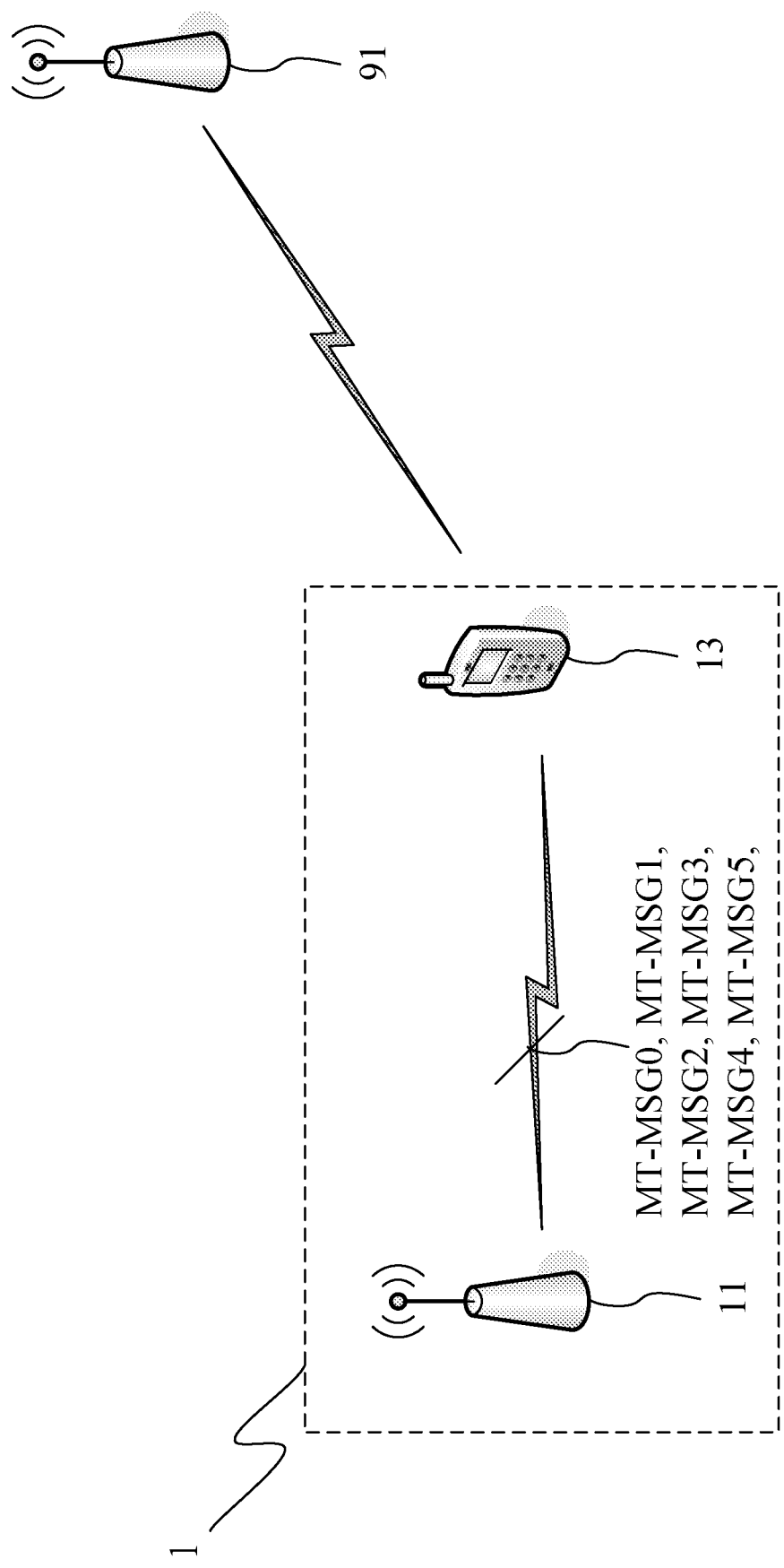
FIG. 7A is a schematic view of the NB-IoT network system according to an embodiment of the present disclosure.

FIG. 7A is a schematic view of the NB-IoT network system 1 according to an embodiment of the present disclosure. FIGS. 7B to 7G are schematic views of message transmission according different embodiments of the present disclosure. When the configuration 110 configures the user equipment 13 to transmit the SON information 130 to the base station 11 and the user equipment 13 is supported with Mobile Terminated Early Data Transmission (MT-EDT), the transmission of the SON information 130 can be achieved via an MT-EDT procedure.

In detail, in an MT-EDT procedure, the processor 113 of the base station 11 configures the transceiver 111 to transmit a paging information MT-MSG0 to the user equipment 13. The paging information MT-MSG0 is for initializing an MT-EDT procedure. The processor 133 of the user equipment 13 configures the transceiver 131 to receive the paging information MT-MSG0, and then to transmit an MT-EDT transmission preamble MT-MSG1 to the base station 11.

The processor 113 of the base station 11 configures the transceiver 111 to receive the MT-EDT transmission preamble MT-MSG1, and then to transmit an MT-EDT transmission response MT-MSG2 to the user equipment 13. The processor 133 of the user equipment 13 configures the transceiver 131 to receive the MT-EDT transmission response MT-MSG2, and then to transmit an EDT message MT-MSG.3 to the base station 11. The processor 113 of the base station 11 configures the transceiver 111 to receive the EDT message MT-MSG3, and then to transmit an EDT response MT-MSG4 to the user equipment 13.

Figure 7B:
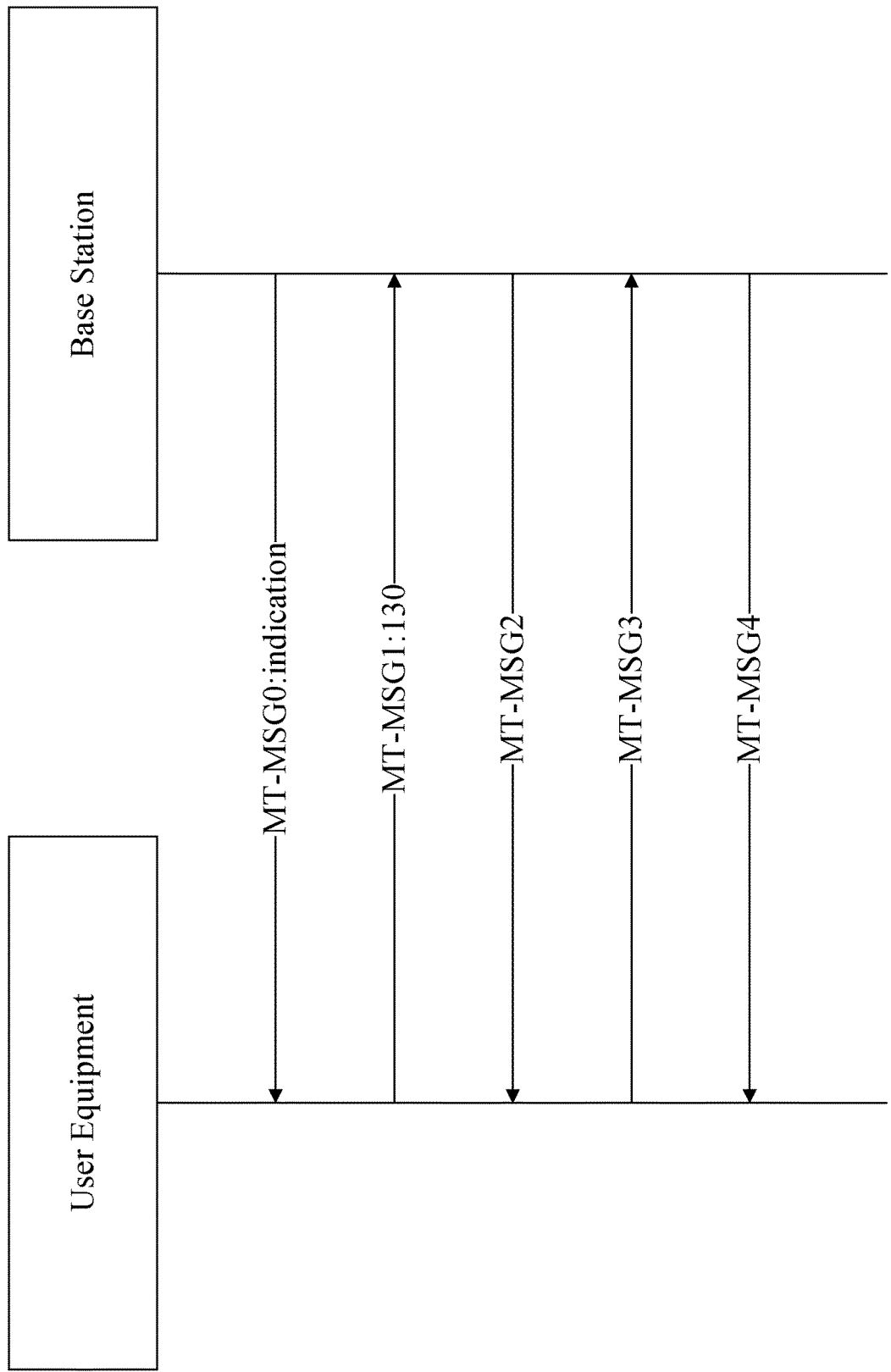
FIGS. 7B to 7K are schematic views of message transmission according different embodiments of the present disclosure.
Figure 7C:
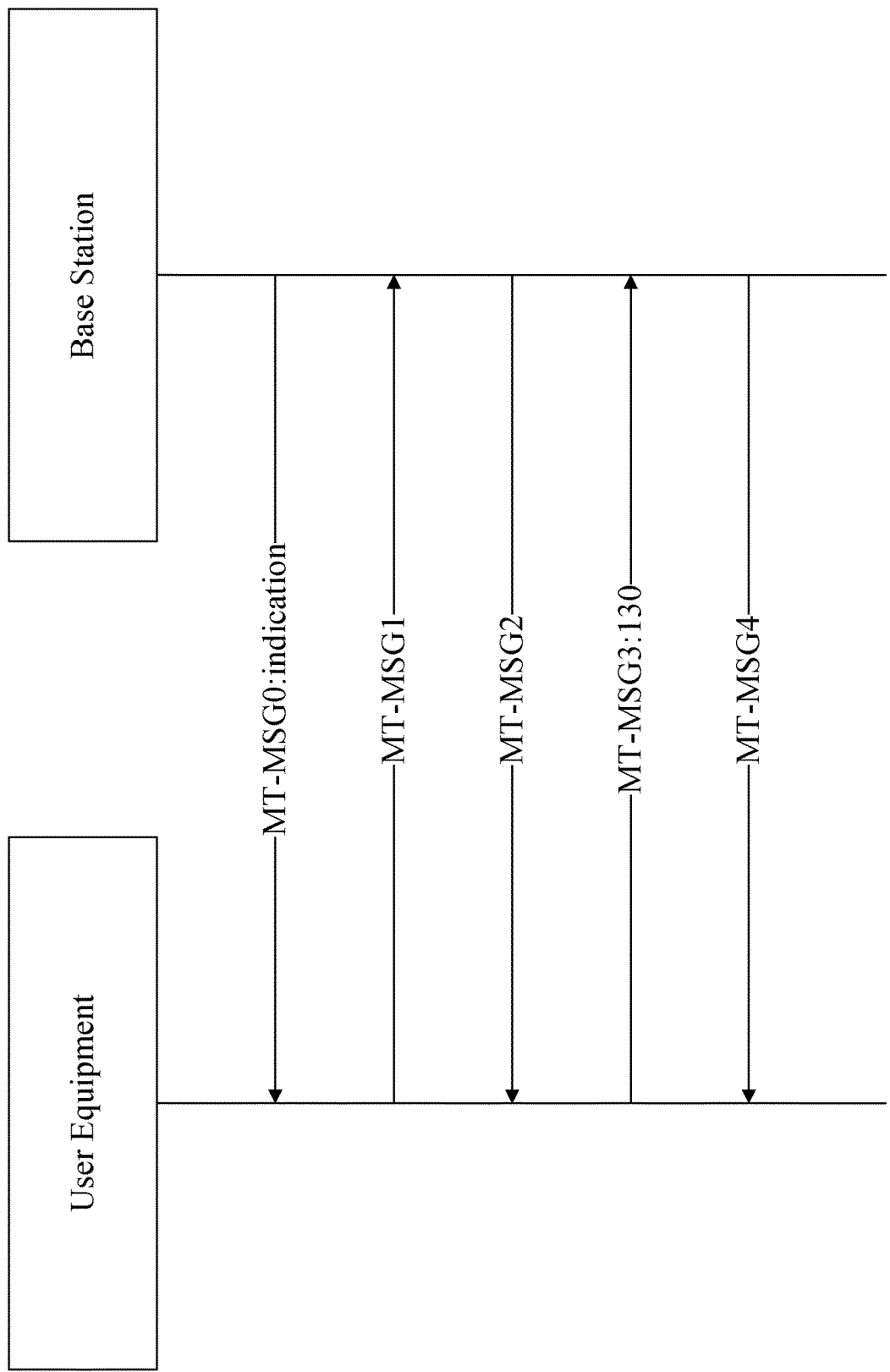

Referring to FIGS. 7B and 7C, in some embodiments, an indication can be embedded in the paging information MT-MSG0, wherein the indication is used for indicating to the user equipment 13 that the SON information 130 should be embedded in the MT-EDT preamble MO-MSG1 or embedded in the EDT message MT-MSG3. In some embodiments, the SON information 130 is embedded in the EDT message MT-MSG3 independently. In some embodiments, the EDT message MO-MSG3 further includes user data (not shown), and the SON information 130 is transmitted with the user data via the EDT message MO-MSG3.

Figure 7D:
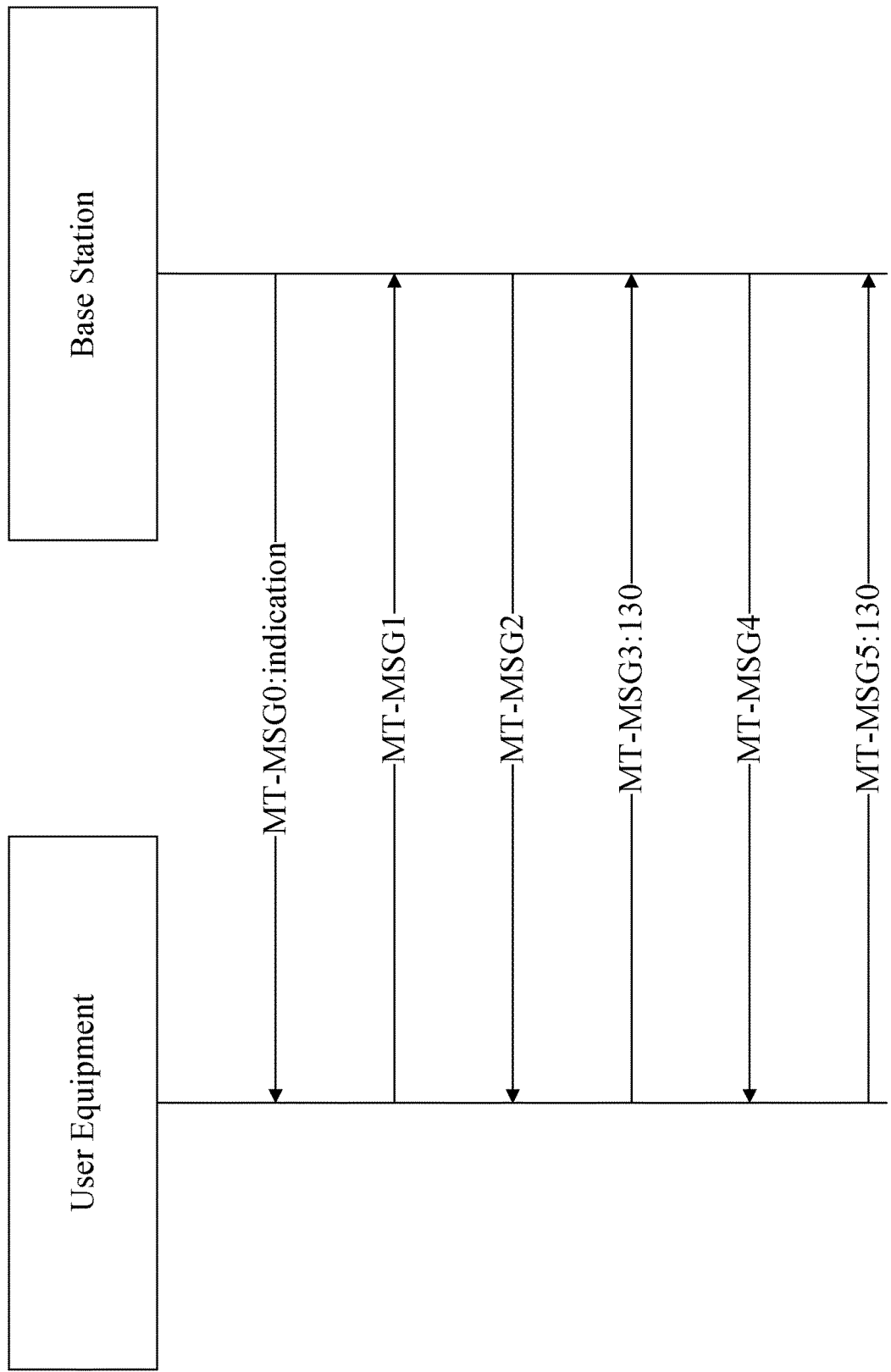

Referring to FIG. 7D, in some embodiments, an EDT message MT-MSG5 is introduced for the user equipment 13 to transmit overflow data. In these embodiments, the size of the SON information 130 is greater than the size of the EDT message MT-MSG3. Accordingly, an indication can be embedded in the paging information MT-MSG0, wherein the indication is used for indicating to the user equipment 13 that: (1) the SON information 130 should be divided into two parts—a first part and a second part; and (2) the first part of the SON information 130 should be embedded in the EDT message MO-MSG3 and the second part of the SON information 130 should be embedded in the EDT message MO-MSG5.

Figure 7E:
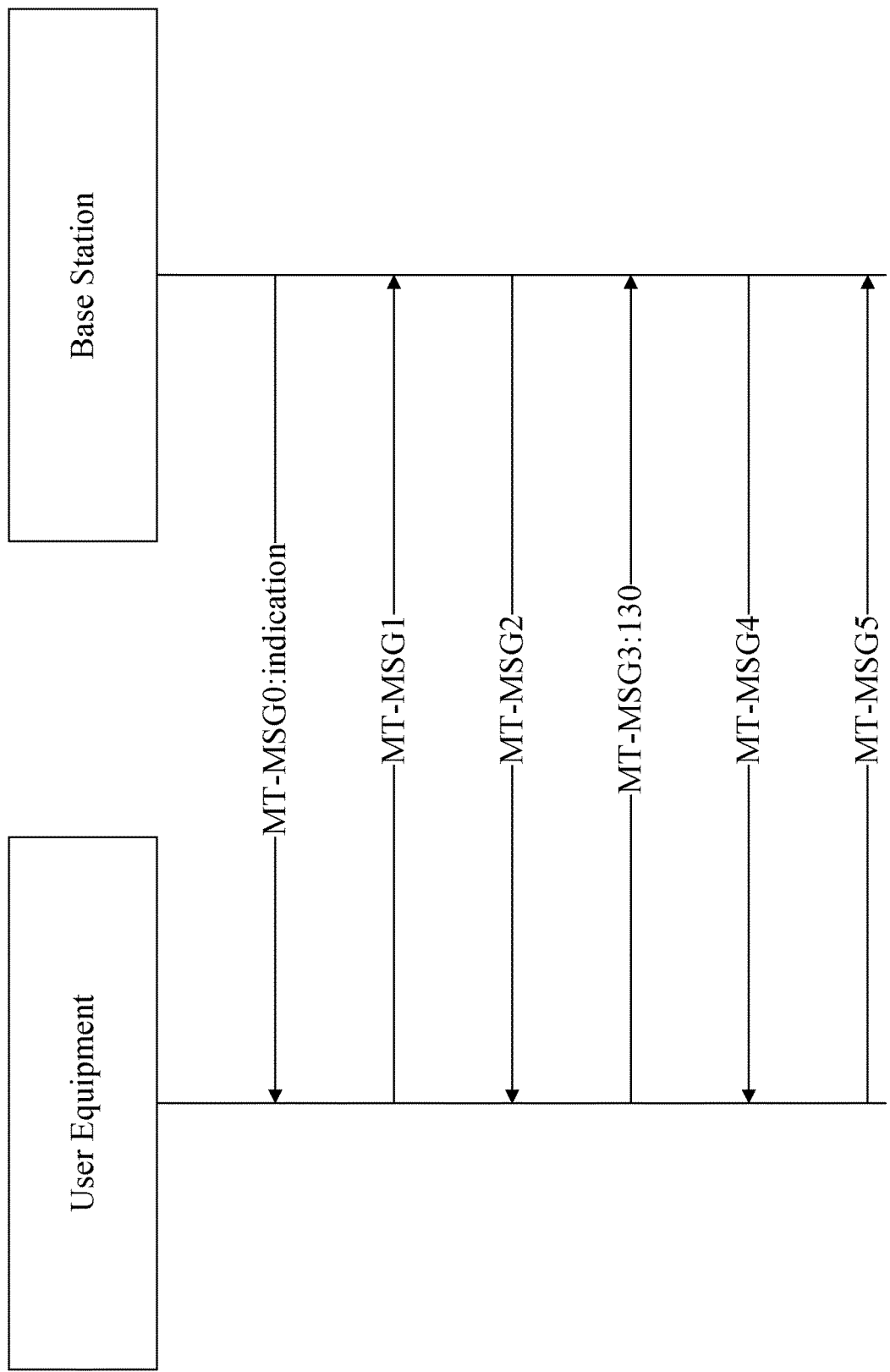
Figure 7F:
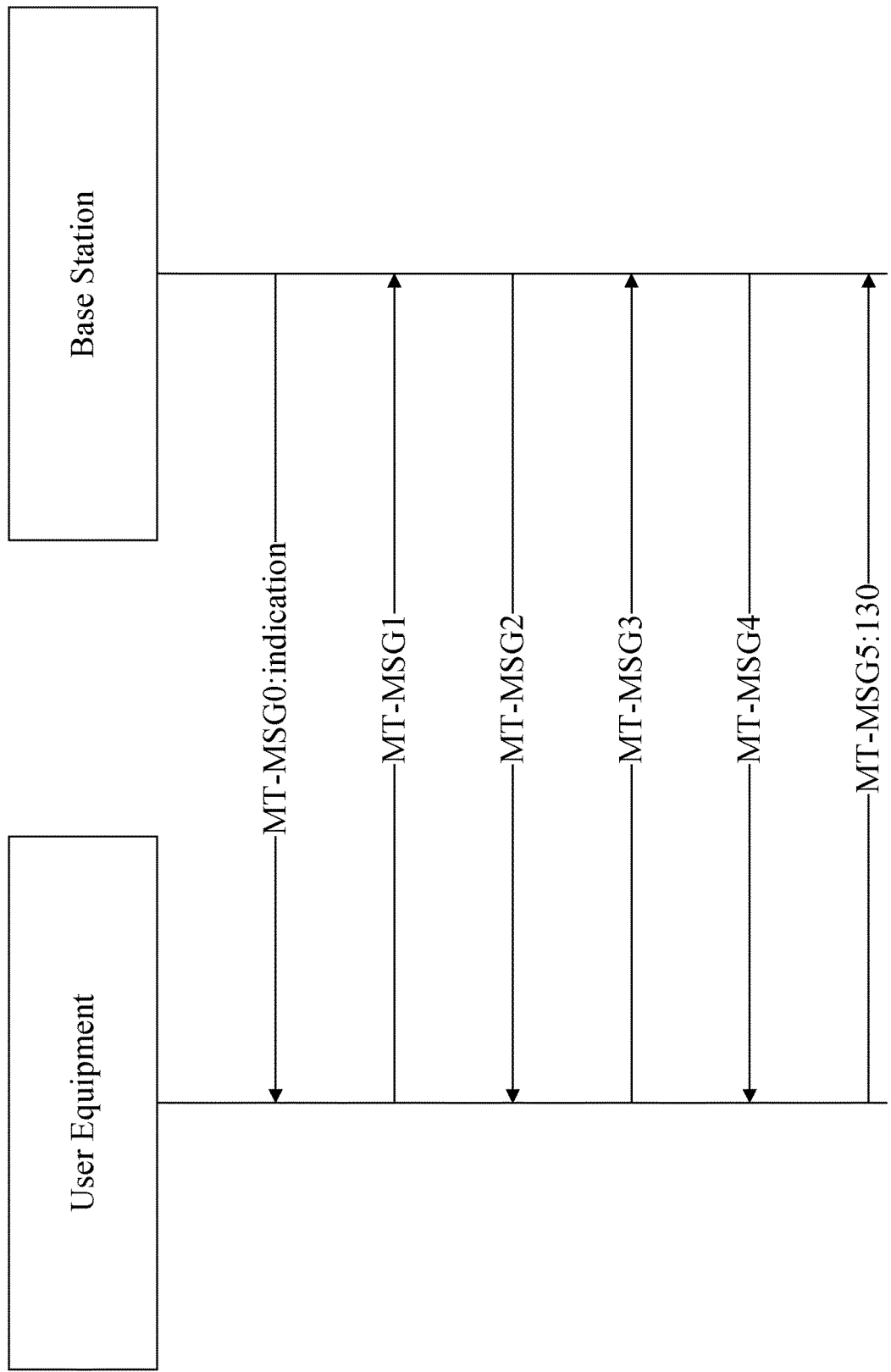

Referring to FIGS. 7E to 7F, in some embodiments, the EDT message MT-MSG5 is introduced for the user equipment 13 to transmit remaining data while the size of user data is over the size of the EDT message MT-MSG3. In these embodiments, an indication can be embedded in the paging information MT-MSG0, wherein the indication is used for indicating to the user equipment 13 that the SON information 130 should be embedded in the EDT message MT-MSG3 with the user data or embedded in the EDT message MT-MSG5 with the remaining data.

Figure 7G:
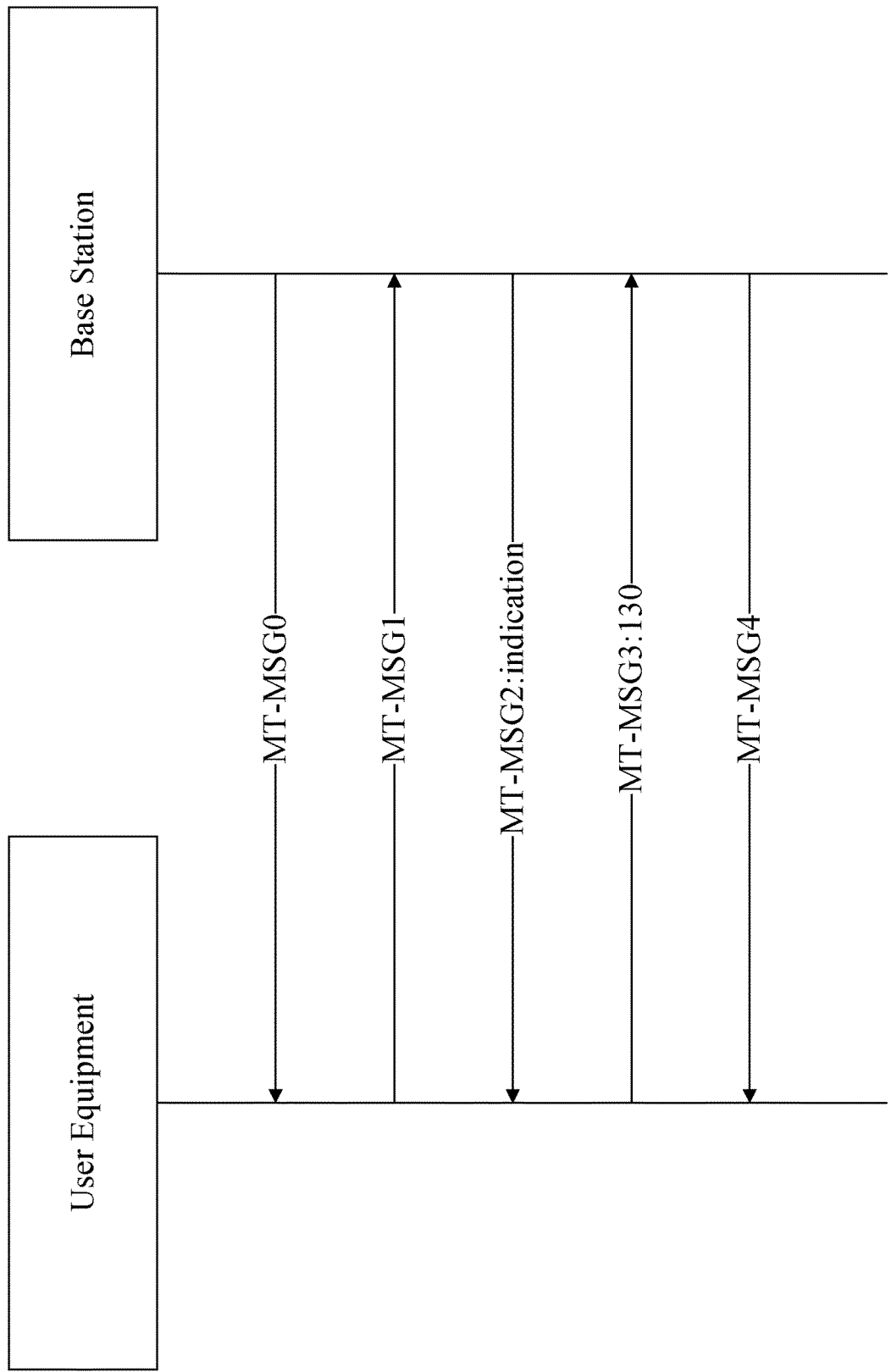
Figure 7H:
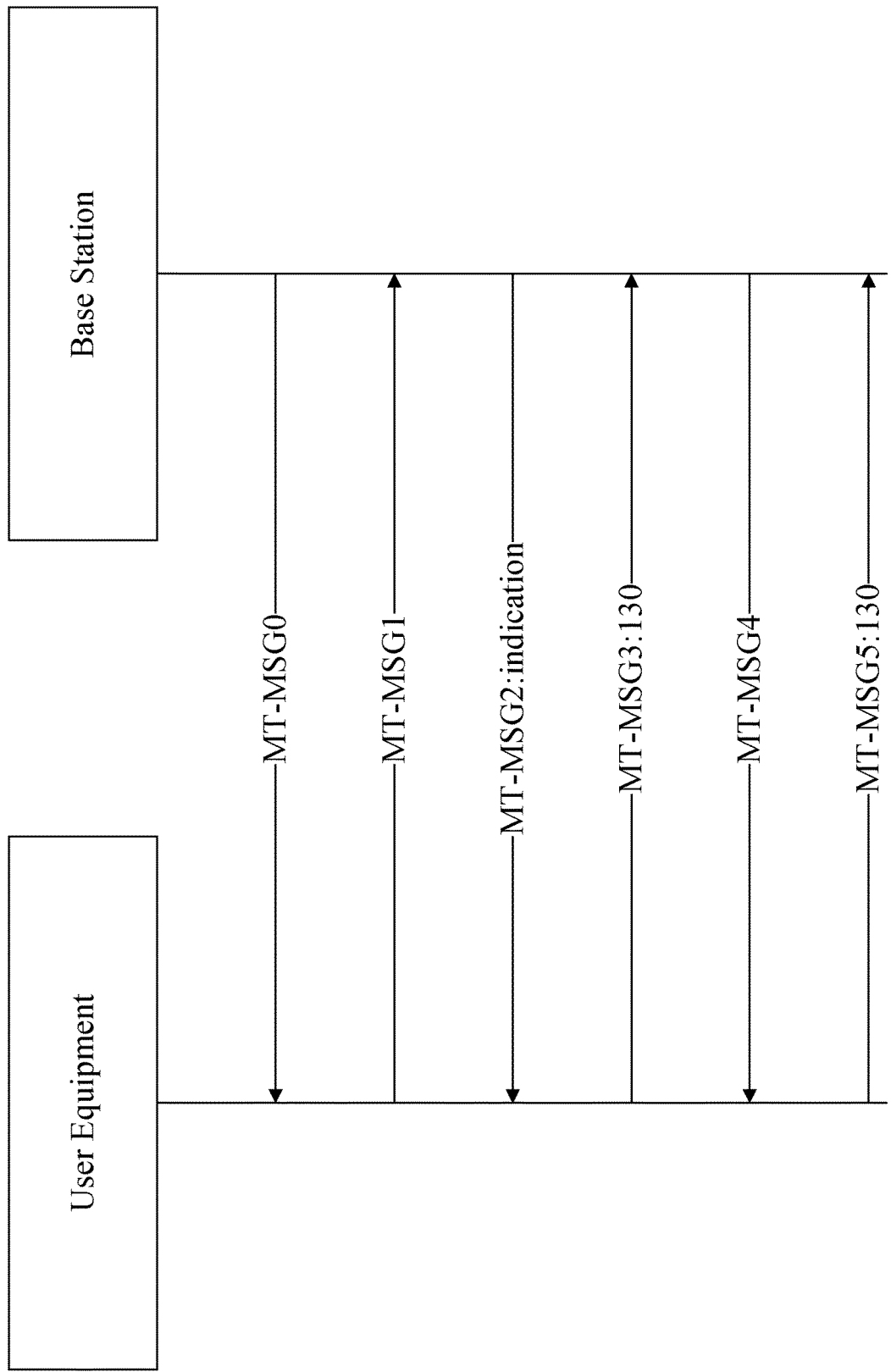
Figure 7I:
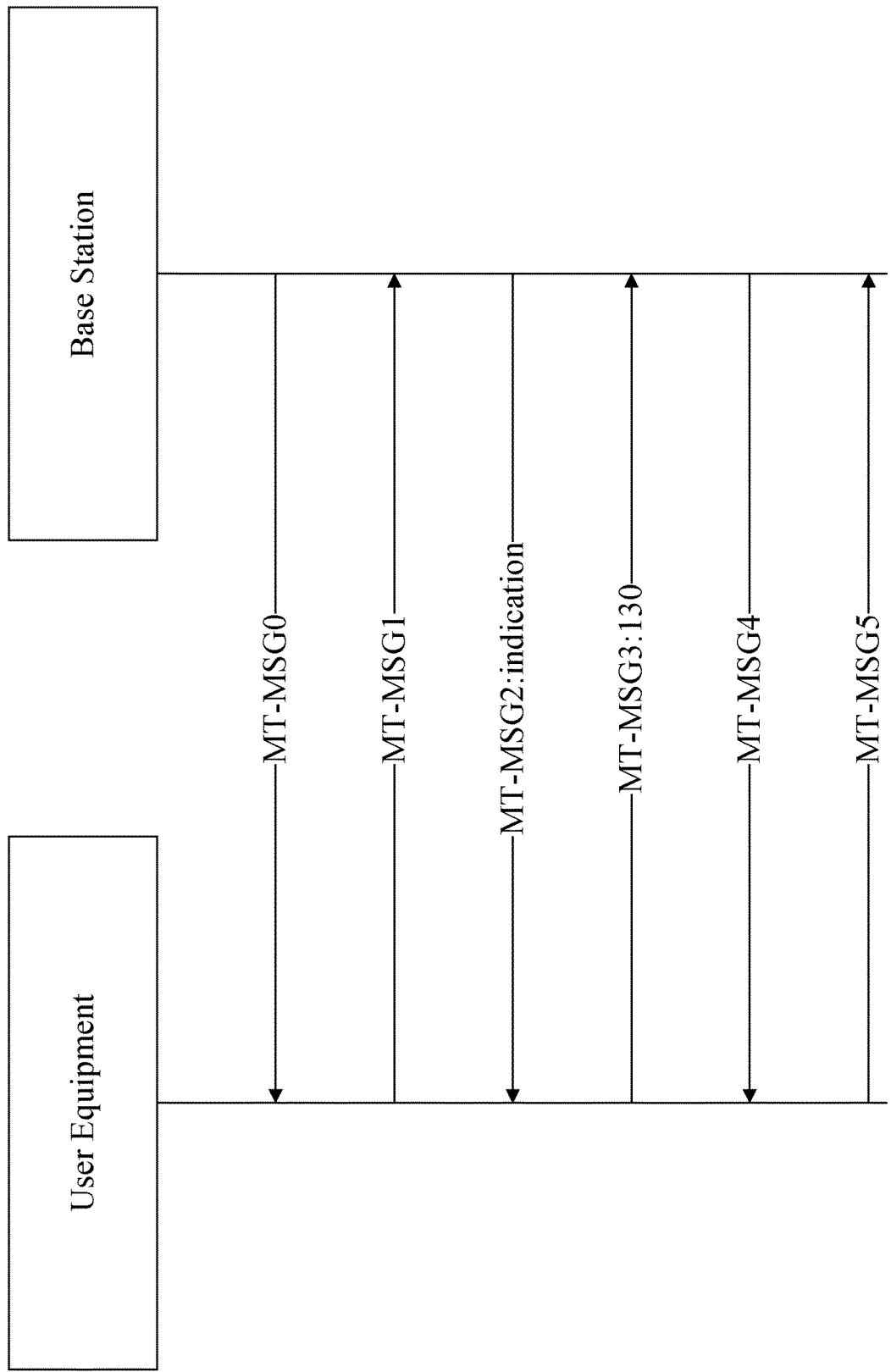
Figure 7J:
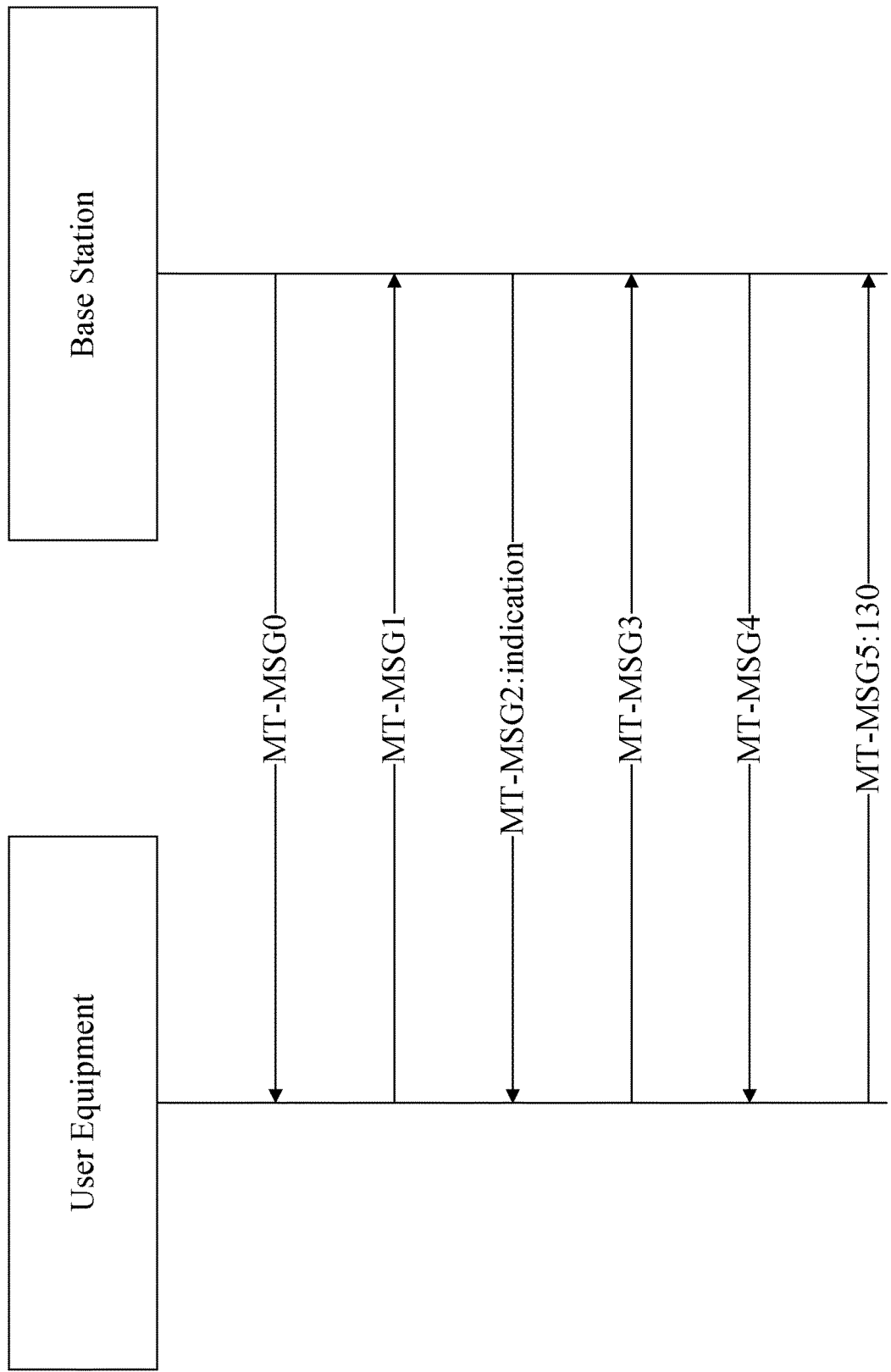

In some embodiments, an indication can be embedded in the MT-EDT transmission response MT-MSG2, wherein the indication is used for indicating to the user equipment 13 that the SON information 130 should be: (1) embedded in the EDT message MT-MSG3 as shown in FIG. 7G; (2) embedded in the EDT message MT-MSG3 and the potential EDT message MT-MSG5 as shown in FIG. 7H; (3) embedded in the EDT message MT-MSG3 with the user data as shown in FIG. 7I; or (4) embedded in the potential EDT message MT-MSG5 with the remaining data as shown in FIG. 7J.

Figure 7K:
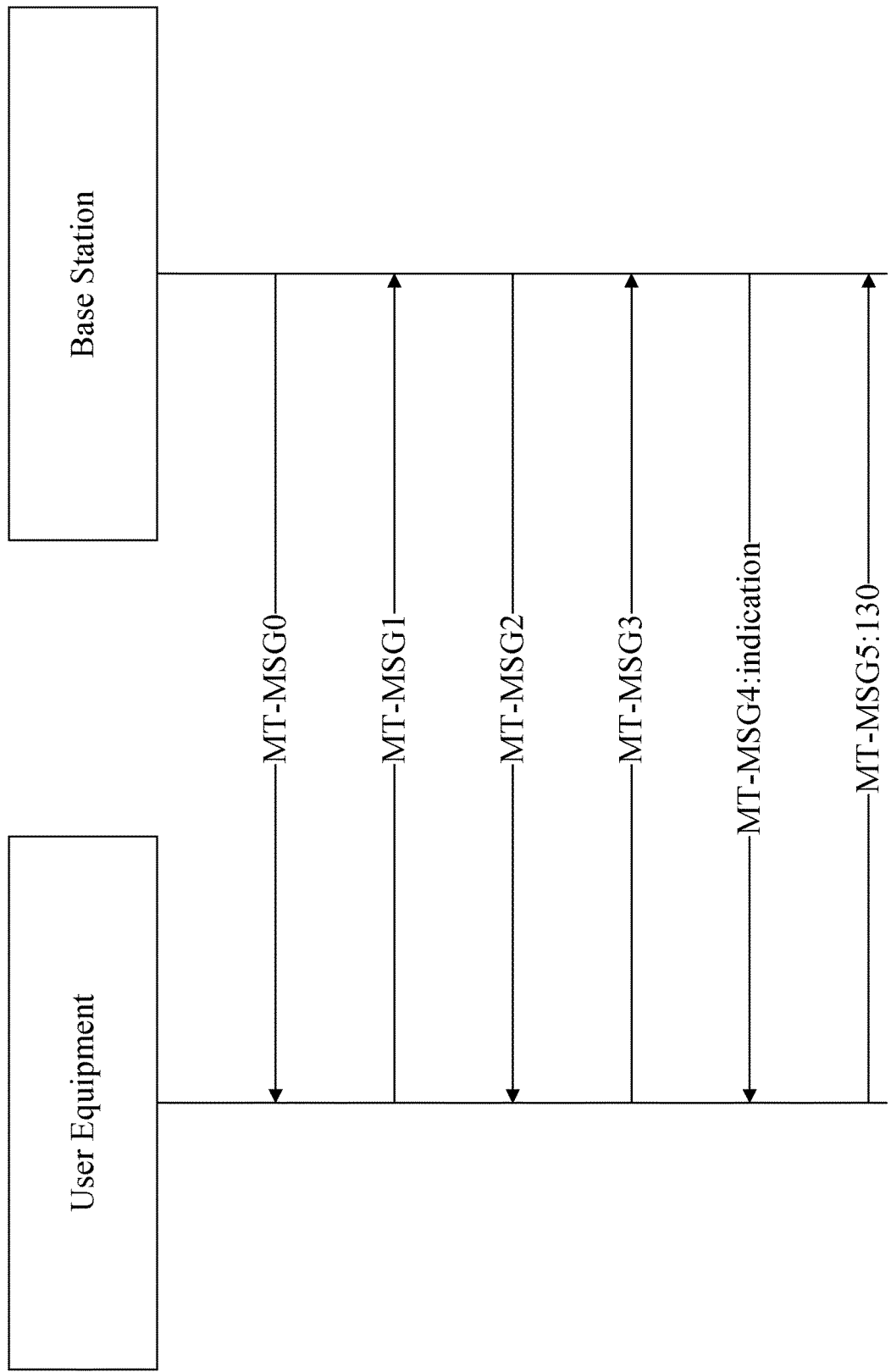

Referring to FIG. 7K, in some embodiments, when the EDT message MO-MSG5 is introduced, an indication can be embedded in EDT response MT-MSG4, wherein the indication is used for indicating to the user equipment 13 that the SON information 130 should be embedded in the EDT message MT-MSG5.

In some embodiments, because the user equipment 13 may wait to transmit user data for an unexpected period (e.g., hours or days), a timer is introduced for transmitting the SON information 130 after a reasonable time period. In detail, the configuration 110 includes an indicator (not shown) or a timer (not shown). The processor 133 of the user equipment 13 configures the transceiver 131 to transmit the SON information to the base station 11 based on the configuration 110 including the indicator or the timer. The indicator of the configuration 110 is used to configure the user equipment 13 to transmit the SON information 130 to the base station 11 either: (1) after receiving the SON parameter 910 from the base station 91; or (2) after the specific period. The user equipment 13 transmits the SON information 130 to the base station 11 with data after receiving the SON parameter 910 from the base station 91 based on the indicator. The SON information 130 may include the SON parameter 910 of the base station 91.

In addition, the user equipment 13 may transmit the SON information 130 to the base station 11 when the timer is expired. In other words, the transmission of the SON information 130 may be triggered when timer is expired. In some embodiments, the timer may be preset in the user equipment 130.

In some embodiments, when the SON information 130 is transmitted with user data or when the SON information 130 is transmitted before timer expiring, the timer will be reset, stopped or deleted. In some embodiments, the timer is a default setting in the user equipment 13 or is transmitted from the base station 11.

In some embodiment, the SON information 130 may include at least one of the SON parameter 910, the RA parameter of the user equipment 13 and the RLF parameter of the user equipment 13. In detail, the SON parameter 910 includes a CGI of the base station 91, the PCI of the base station 91, or the combination thereof. In detail, the SON parameter 910 may include at least one of the latest CGI of the base station 91 and the PCI of the base station 91. In some embodiments, the SON information 130 further includes an RA parameter of the user equipment 13, a Radio Link Failure (RLF) parameter of the user equipment 13, or a combination thereof.

It shall be particularly appreciated that the processors mentioned in the above embodiments may be a central processing unit (CPU), other hardware circuit elements capable of executing relevant instructions, or combination of computing circuits that are well-known by those skilled in the art based on the above disclosures. Moreover, the transceivers mentioned in the above embodiments may be a combination of a network data transmitter and a network data receiver. However, such description is not intended to limit the hardware implementation embodiments of the present disclosure.

Figure 8:
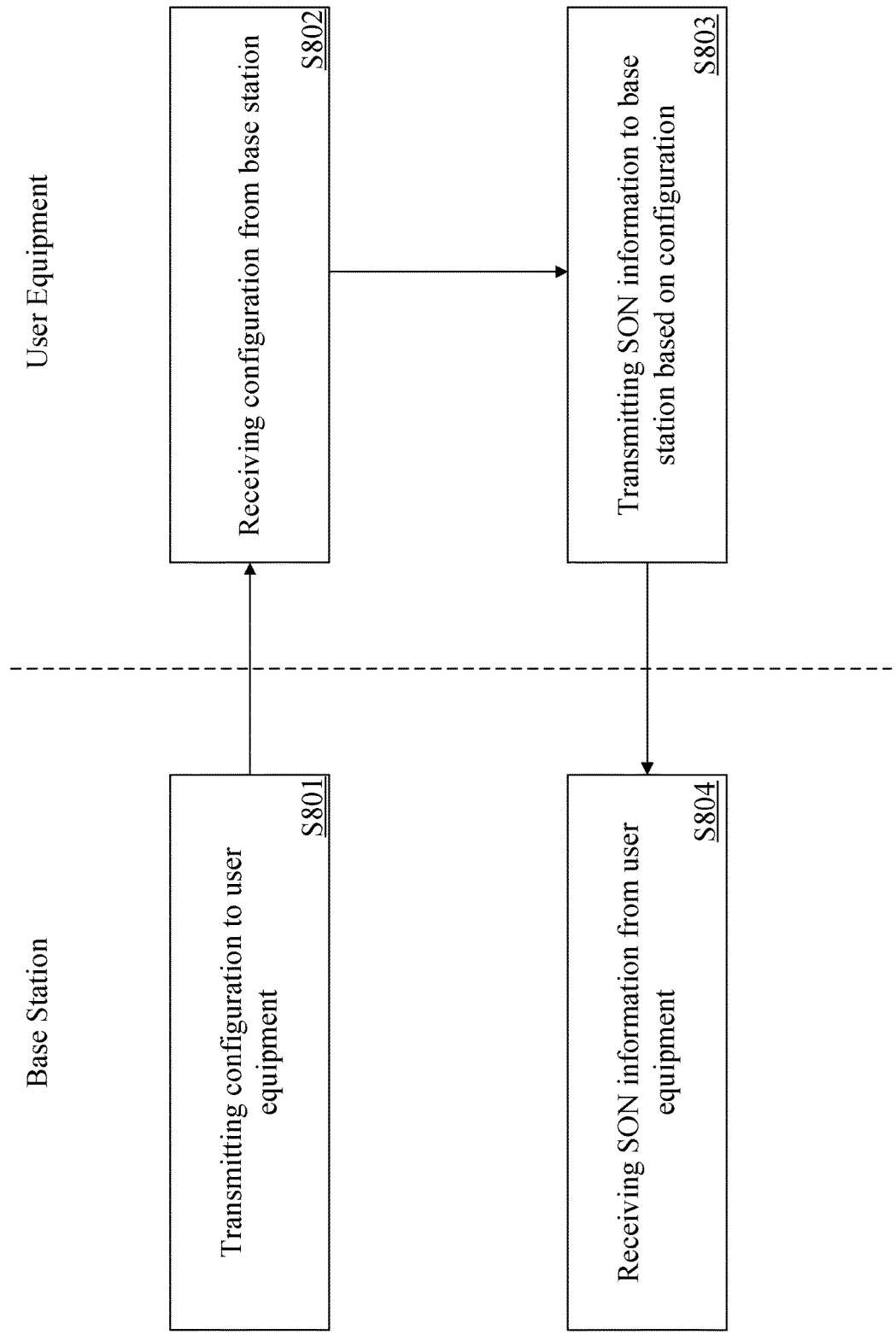
FIG. 8 is a flowchart diagram according to an embodiment of the present disclosure.

Some embodiments of the present disclosure include a SON information transmission method, and flowchart diagram thereof is as shown in FIG. 8. The method of some embodiments is for use in an NB-IoT network system (e.g., the NB-IoT network system of the aforesaid embodiments), and the NB-IoT network system includes a user equipment and a base station. Detailed operations of the SON information transmission method are as follows.

Operation S801 is executed to transmit, by the base station, a configuration to the user equipment. The configuration configures the user equipment to transmit SON information either: (1) after the user equipment receives SON parameter from another base station, wherein SON information includes SON parameter of another base station: or (2) after a specific period.

Operation S802 is executed to receive, by the user equipment, the configuration from the base station. Operation S803 is executed to transmit, by the user equipment, an SON information to the base station based on the configuration. Operation S804 is executed to receive, by the user equipment, the SON information from the user equipment.

Figure 9:
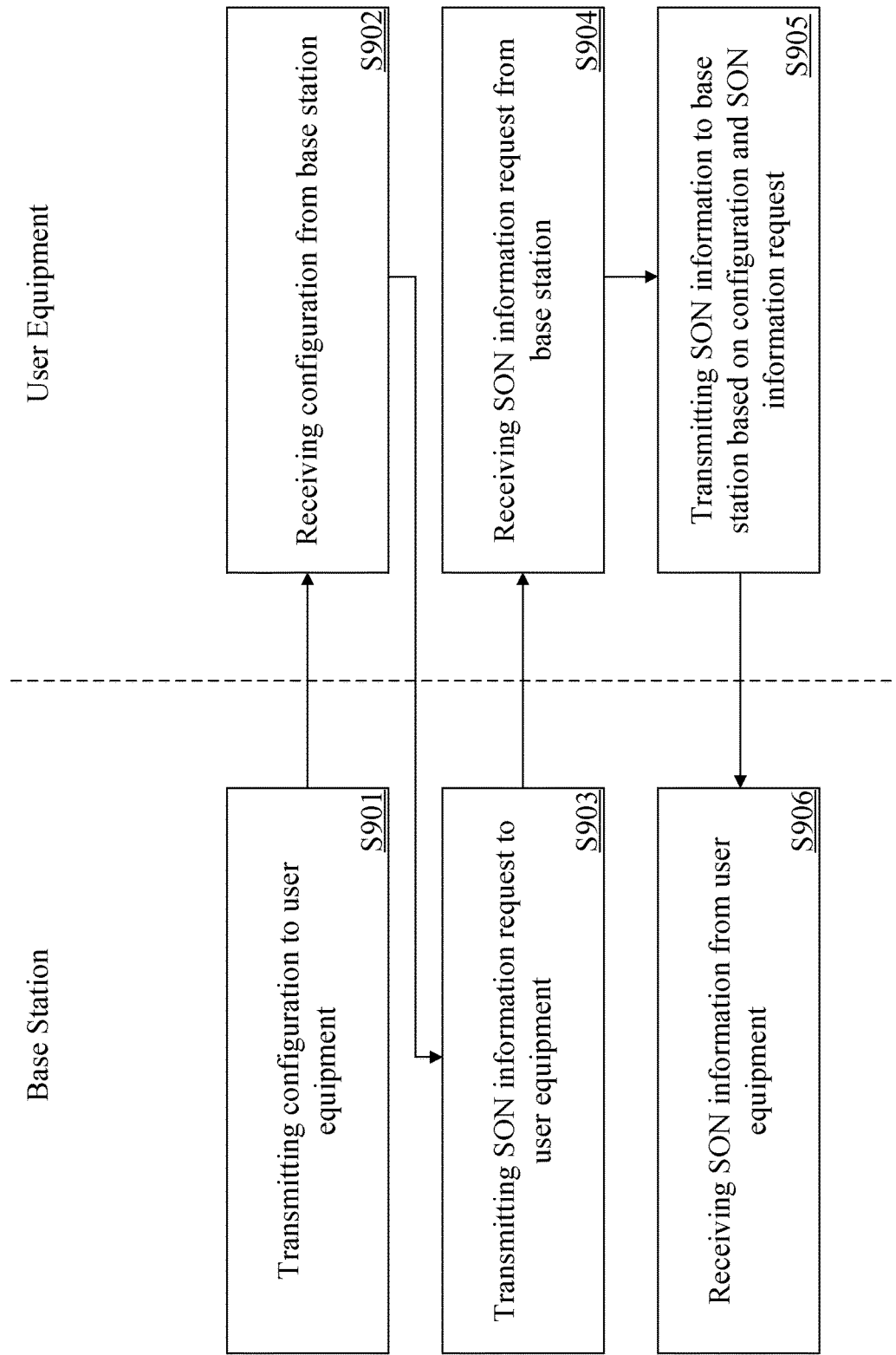
FIG. 9 is a flowchart diagram according to an embodiment of the present disclosure.

Some embodiments of the present disclosure include an SON information transmission method, and flowchart diagram thereof is as shown in FIG. 9. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S901 is executed to transmit, by the base station, a configuration to the user equipment. The configuration configures the user equipment to transmit SON information either: (1) after the user equipment receives SON parameter from another base station, wherein SON information includes SON parameter of another base station; or (2) after a specific period.

Operation S902 is executed to receive, by the user equipment, the configuration from the base station. Operation S903 is executed to transmit, by the base station, a SON information request to the user equipment. Operation S904 is executed to receive, by the user equipment, the SON information request from the base station. Operation S905 is executed to transmit, by the user equipment, the SON information to the base station based on the SON information request. Operation S906 is executed to receive, by the user equipment, the SON information from the user equipment.

Figure 10:
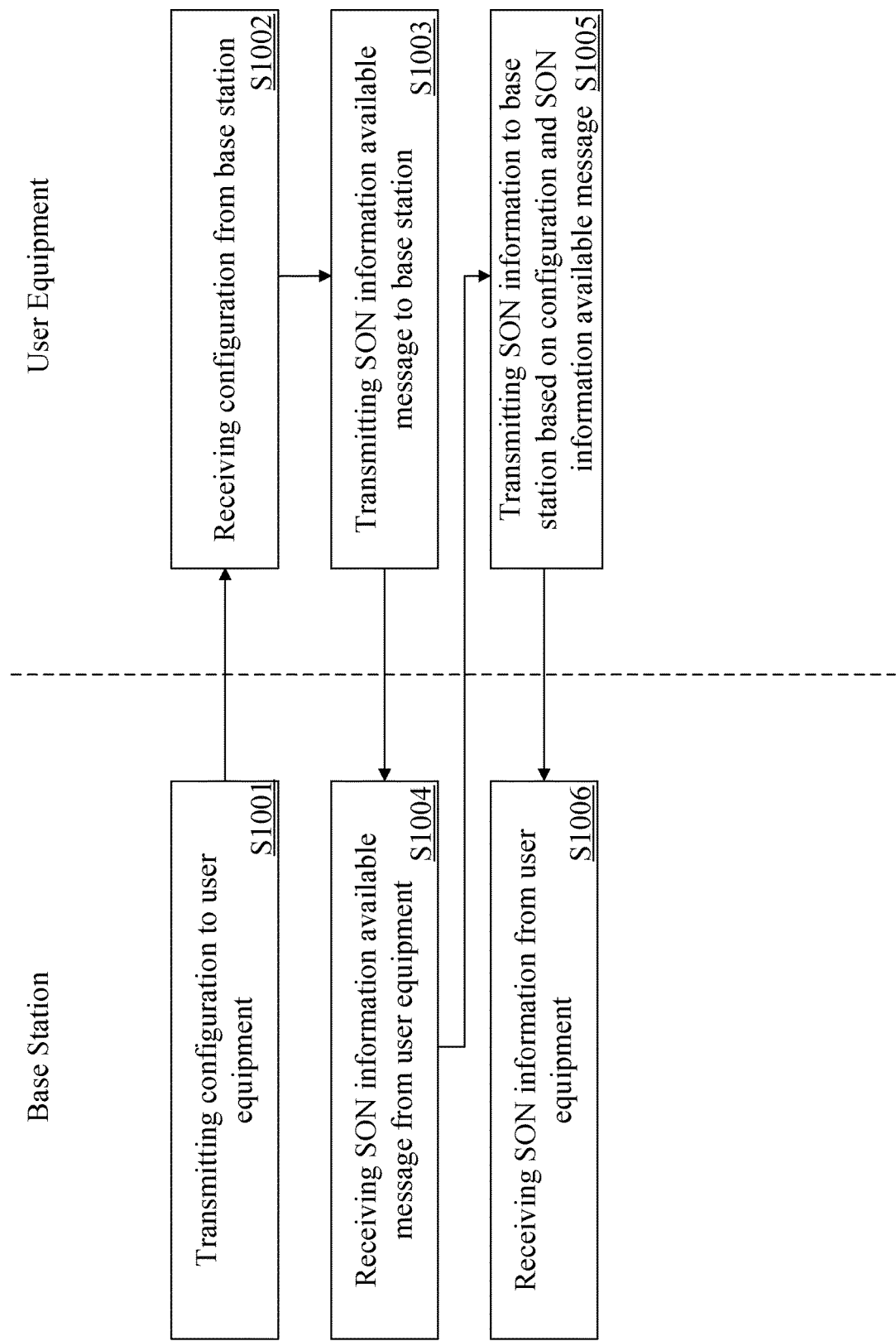
FIG. 10 is a flowchart diagram according to an embodiment of the present disclosure.

Some embodiments of the present disclosure include an SON information transmission method, and flowchart diagram thereof is as shown in FIG. 10. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S1001 is executed to transmit, by the base station, a configuration to the user equipment. The configuration configures the user equipment to transmit SON information either: (1) t after the user equipment receives SON parameter from another base station, wherein SON information includes SON parameter of another base station; or (2) after a specific period.

Operation S1002 is executed to receive, by the user equipment, the configuration from the base station. In this embodiment, when a SON information is ready, operation S1003 is executed to transmit, by the user equipment, a SON information available message to the base station. Operation S1004 is executed to receives, by the base station, the SON information available message from the user equipment. Operation S1005 is executed to transmit, by the user equipment, the SON information to the base station based on the configuration and the SON information available message. Operation S1006 is executed to receive, by the user equipment, the SON information from the user equipment based on the configuration and the SON information available message.

Figure 11:
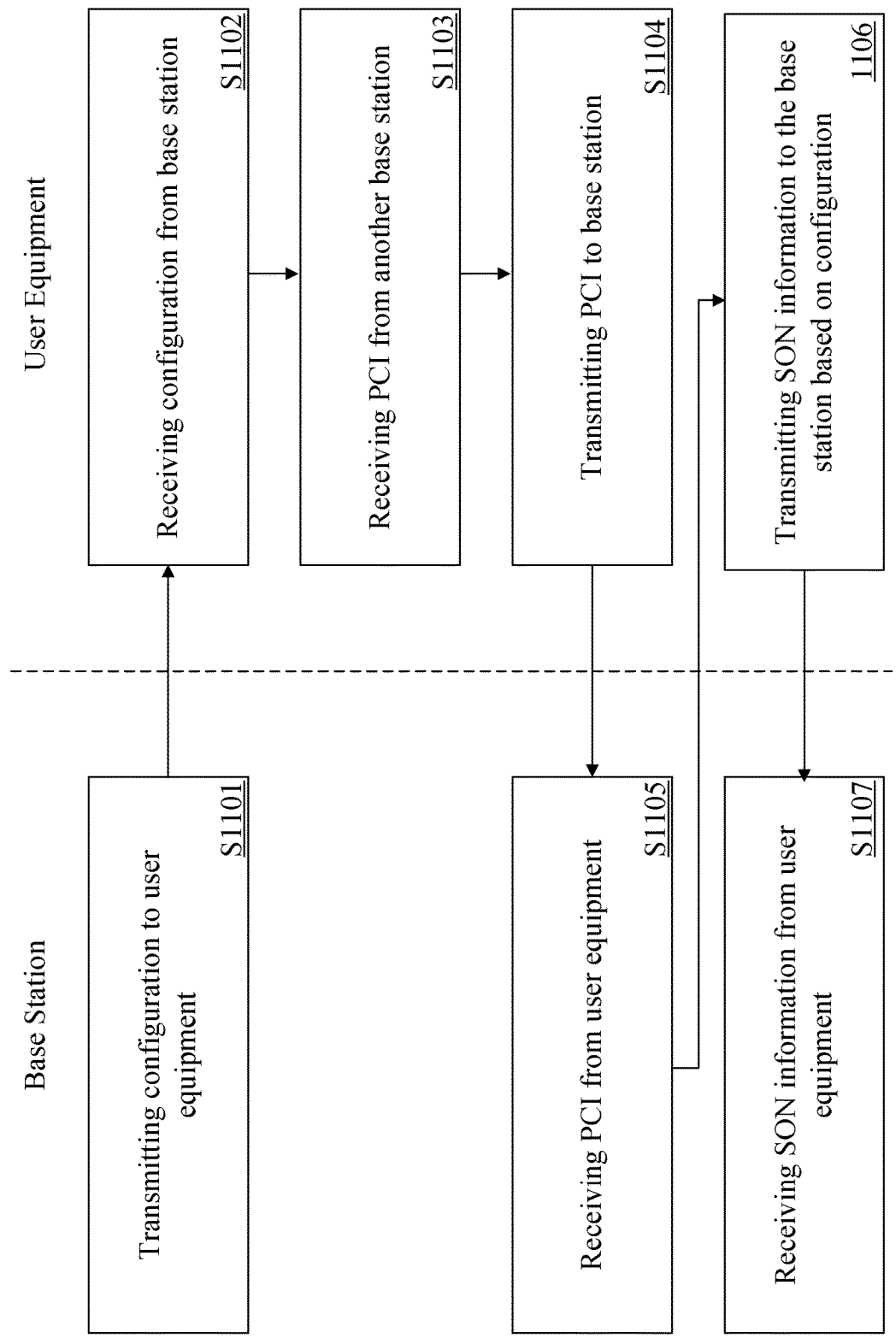
FIG. 11 is a flowchart diagram according to an embodiment of the present disclosure.

Some embodiments of the present disclosure include a SON information transmission method, and flowchart diagram thereof is as shown in FIG. 11. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S1101 is executed to transmit, by the base station, a configuration to the user equipment. The configuration configures the user equipment to transmit SON information either: (1) after the user equipment receives SON parameter from another base station, wherein SON information includes SON parameter of another base station; or (2) after a specific period.

Operation S1102 is executed to receive, by the user equipment, the configuration from the base station. Operation S1103 is executed to receive, by the user equipment, a PCI from the another base station. Operation S1104 is executed to transmit, by the user equipment, the PCI to the base station. Operation S1105 is executed to receive, by the base station, the PCI from the user equipment. Operation S1106 is executed to transmit, by the user equipment, a SON information to the base station based on the configuration.

Operation S1107 is executed to receive, by the user equipment, the SON information from the user equipment.

Figure 12A:
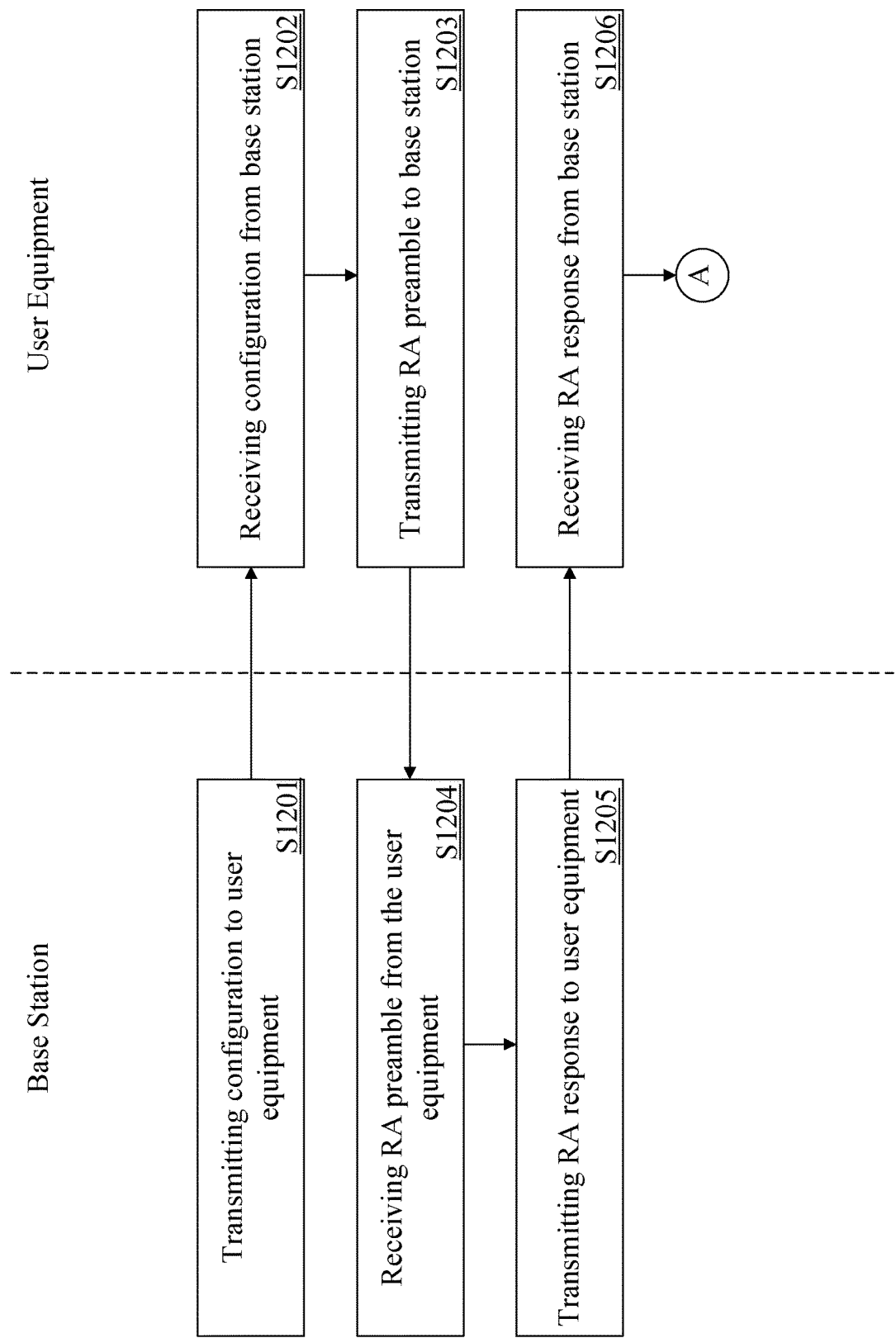
FIGS. 12A to 12B are flowchart diagrams according to an embodiment of the present disclosure.
Figure 12B:
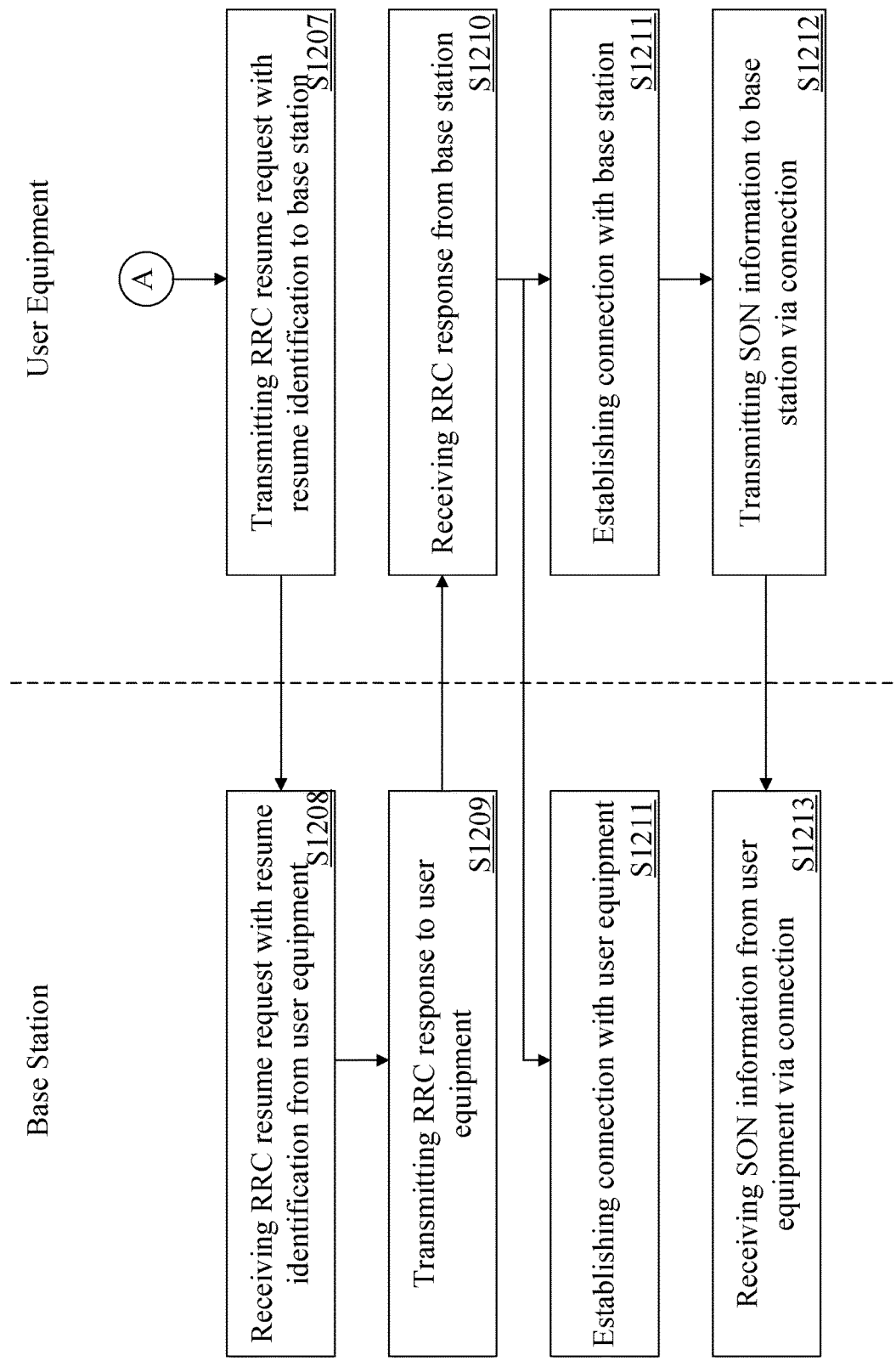

Some embodiments of the present disclosure include a SON information transmission method, and flowchart diagrams thereof are as shown in FIGS. 12A to 12B. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S1201 is executed to transmit, by the base station, a configuration to the user equipment. The configuration configures the user equipment to transmit SON information either: (1) after the user equipment receives SON parameter from another base station, wherein SON information includes SON parameter of another base station; or (2) after a specific period.

Operation S1202 is executed to receive, by the user equipment, the configuration from the base station. Operation S1203 is executed to transmit, by the user equipment, an RA preamble to the base station. Operation S1204 is executed to receive, by the base station, the RA preamble from the user equipment.

Operation S1205 is executed to transmit, by the base station, an RA response to the user equipment. Operation S1206 is executed to receive, by the user equipment, the RA response from the base station. Operation S1207 is executed to transmit, by the user equipment, an RRC resume request with a resume identification to the base station. Operation S1208 is executed to receive, by the base station, the RRC resume request with the resume identification from the user equipment.

Operation S1209 is executed to transmit, by the base station, an RRC resume response to the user equipment. Operation S1210 is executed to receive, by the user equipment, the RRC resume response from the base station. Operation S1211 is executed to establish, by the base station and the user equipment, a connection between the base station and the user equipment. Operation S1212 is executed to transmit, by the user equipment, a SON information to the base station via the connection. The SON information includes a SON parameter of the another base station. Operation S1213 is executed to receive, by the base station, the SON information from the user equipment via the connection.

Figure 13:
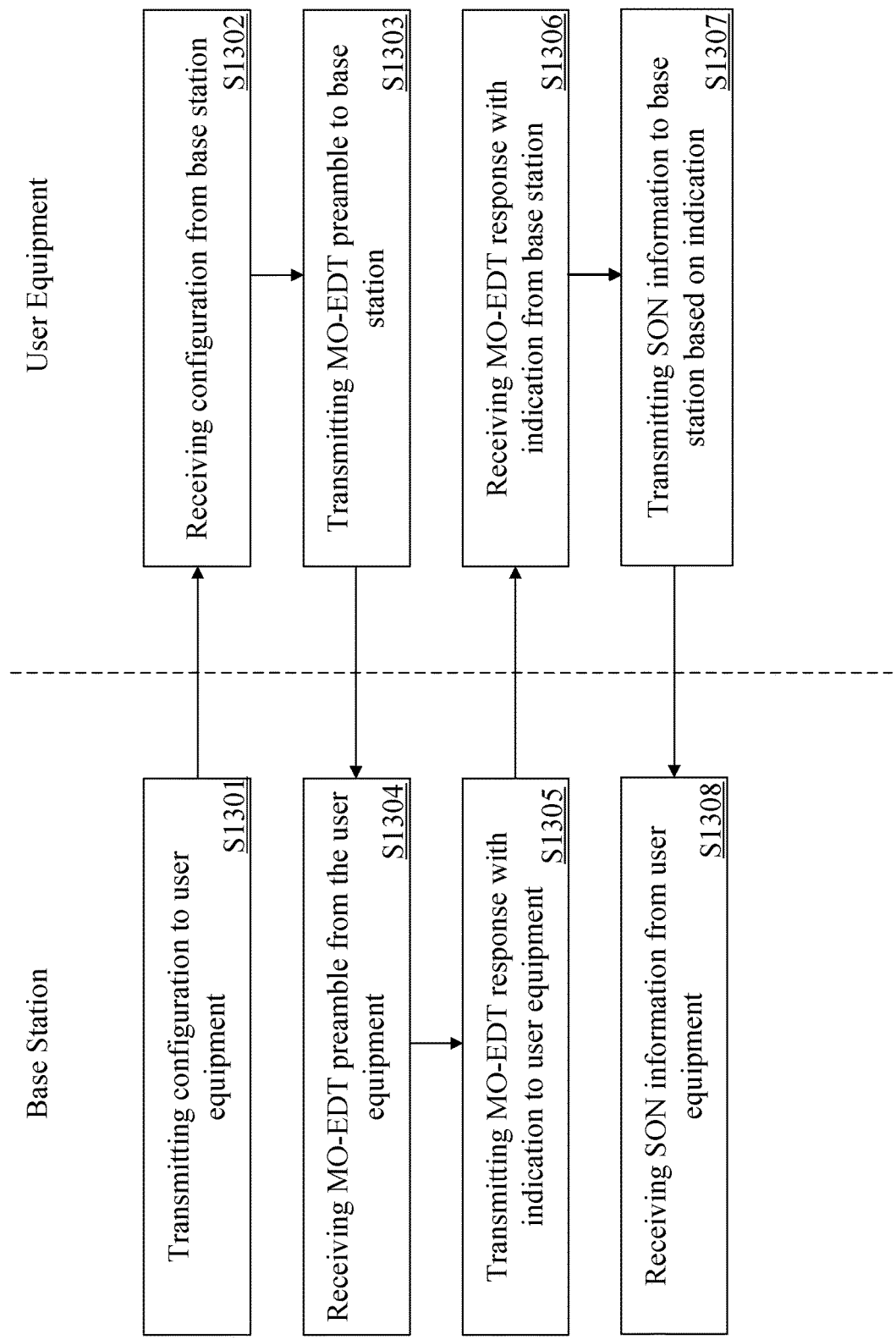
FIG. 13 is a flowchart diagram according to an embodiment of the present disclosure.

Some embodiments of the present disclosure include a SON information transmission method, and flowchart diagram thereof as shown in FIG. 13. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S1301 is executed to transmit, by the base station, a configuration to the user equipment. The configuration configures the user equipment to transmit SON information either: (1) after the user equipment receives SON parameter from another base station, wherein SON information includes SON parameter of another base station; or (2) after a specific period.

Operation S1302 is executed to receive, by the user equipment, the configuration from the base station. Operation S1303 is executed to transmit, by the user equipment, an MO-EDT preamble to the base station. Operation S1304 is executed to receive, by the base station, the MO-EDT preamble from the user equipment.

Operation S1305 is executed to transmit, by the base station, an MO-EDT response to the user equipment. The MO-EDT response includes an indication Operation S1306 is executed to receive, by the user equipment, the MO-EDT response from the base station. Operation S1307 is executed to transmit, by the user equipment, a SON information to the base station based on the indication. Operation S1308 is executed to receive, by the base station, the SON information.

Figure 14A:
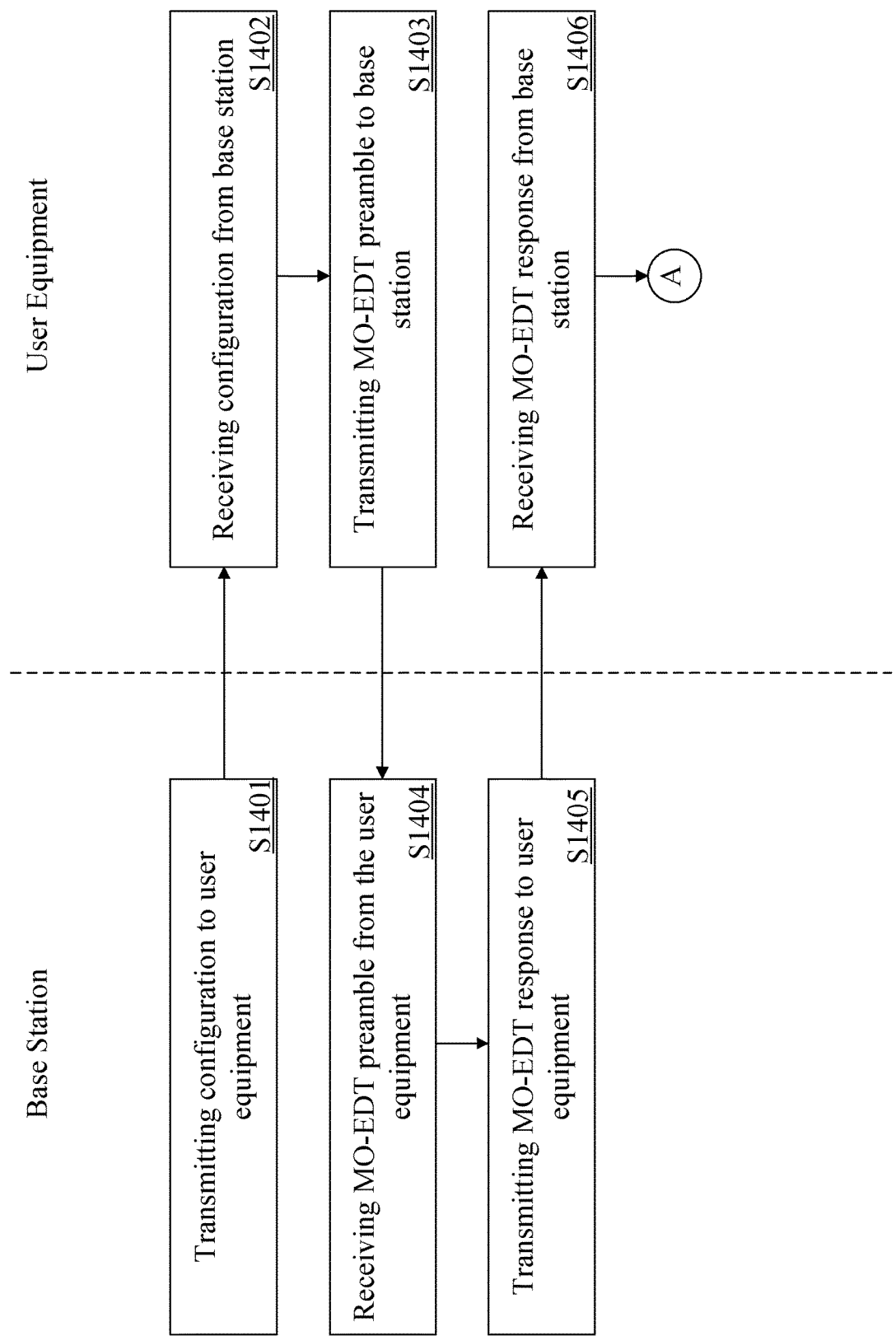
FIGS. 14A to 14B are flowchart diagrams according to an embodiment of the present disclosure.
Figure 14B:
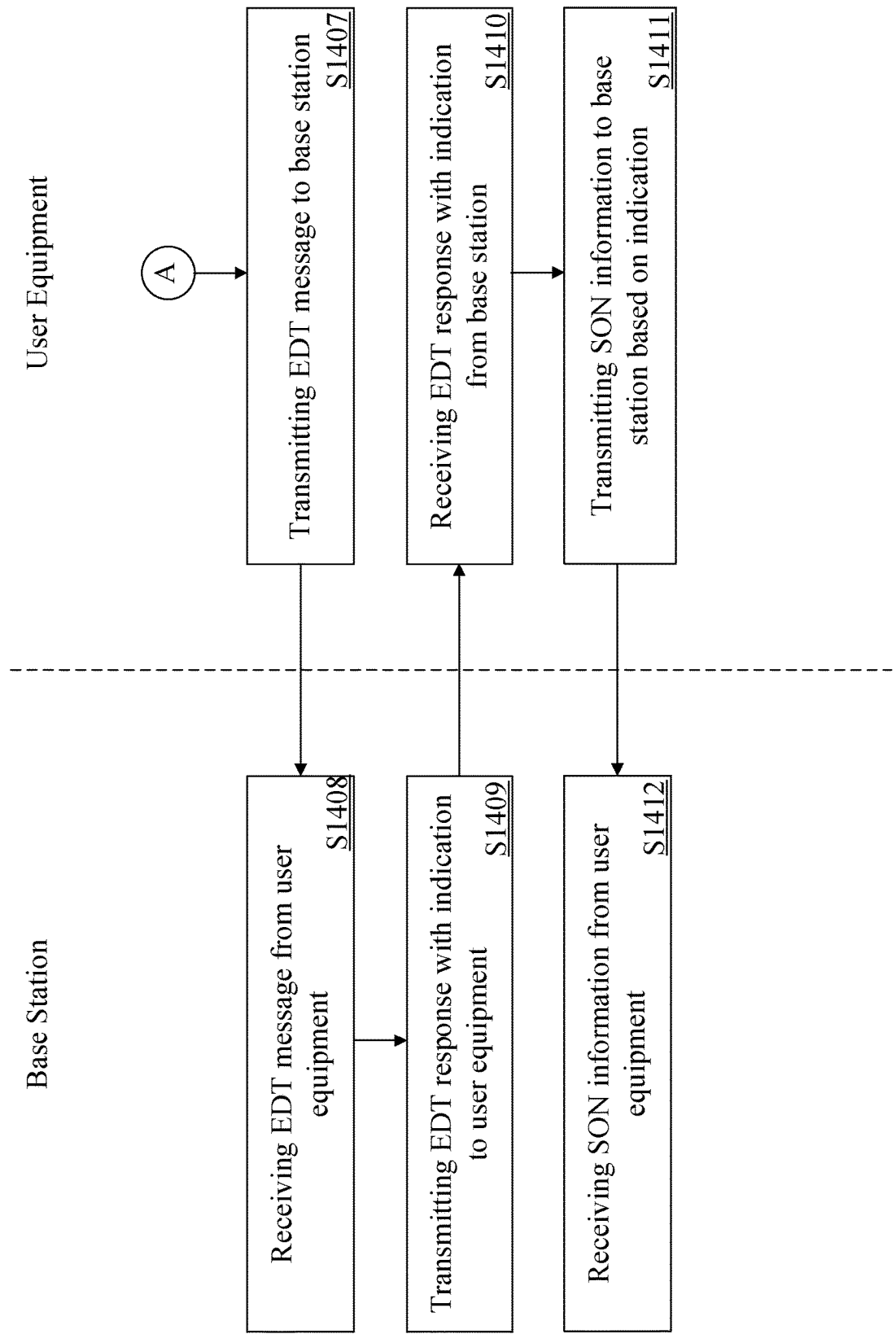

Some embodiments of the present disclosure include a SON information transmission method, and flowchart diagrams thereof are as shown in FIGS. 14A to 14B. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S1401 is executed to transmit, by the base station, a configuration to the user equipment. The configuration configures the user equipment to transmit SON information either: (1) after the user equipment receives SON parameter from another base station, wherein SON information includes SON parameter of another base station; or (2) after a specific period.

Operation S1402 is executed to receive, by the user equipment, the configuration from the base station. Operation S1403 is executed to transmit, by the user equipment, an MO-EDT preamble to the base station. Operation S1404 is executed to receive, by the base station, the MO-EDT preamble from the user equipment.

Operation S1405 is executed to transmit, by the base station, an MO-EDT response to the user equipment. Operation S1406 is executed to receive, by the user equipment, the MO-EDT response from the base station. Operation S1407 is executed to transmit, by the user equipment, an EDT message to the base station. Operation S1408 is executed to receive, by the base station, the EDT message from the user equipment.

Operation S1409 is executed to transmit, by the base station, an EDT response to the user equipment. The EDT response includes an indication. Operation S1410 is executed to receive, by the user equipment, the EDT response from the base station. Operation S1411 is executed to transmit, by the user equipment, a SON information to the base station based on the indication. Operation S1412 is executed to receive, by the base station, the SON information from the user equipment.

Figure 15:
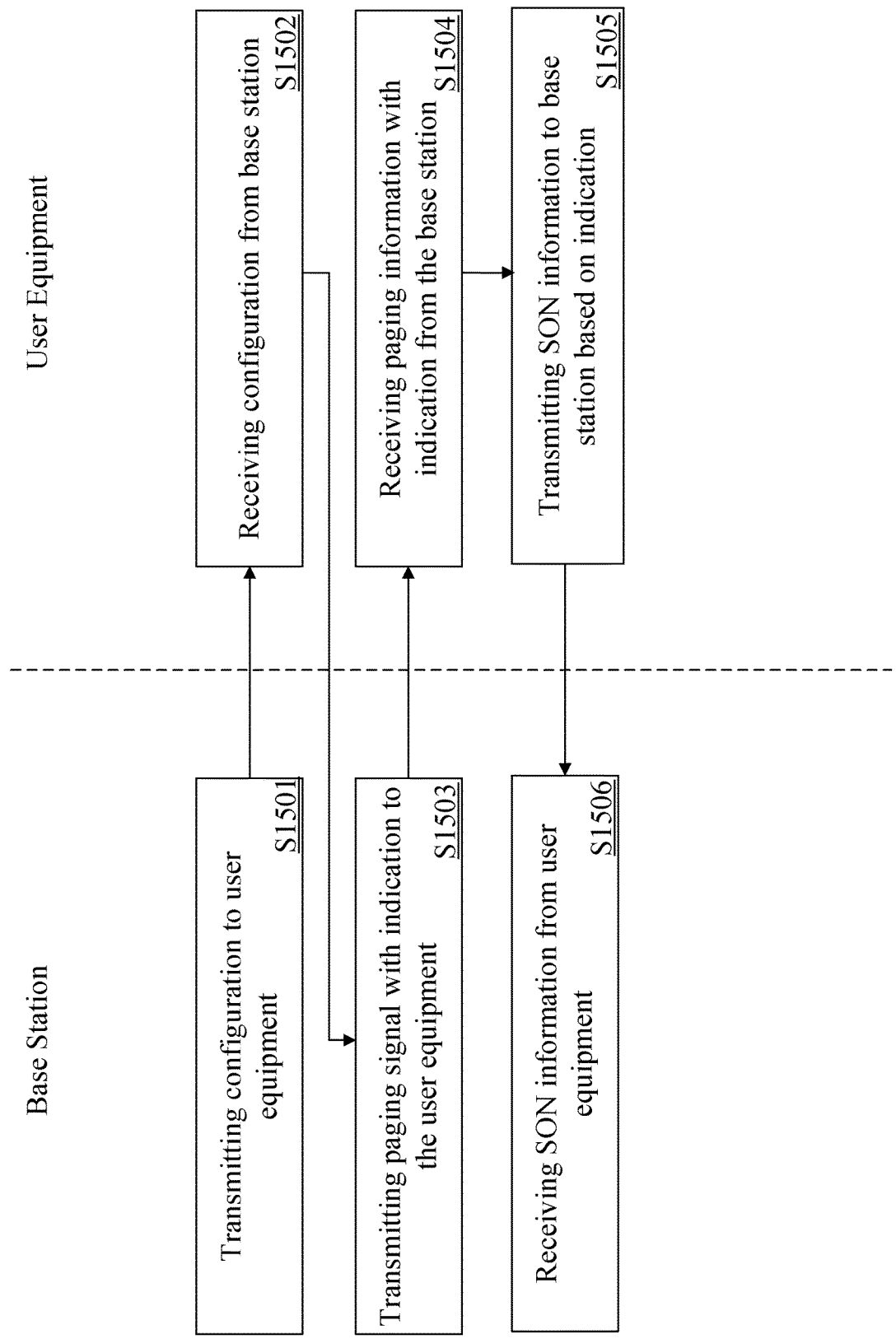
FIG. 15 is a flowchart diagram according to an embodiment of the present disclosure.

Some embodiments of the present disclosure include a SON information transmission method, and flowchart diagram thereof is as shown in FIG. 15. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S1501 is executed to transmit, by the base station, a configuration to the user equipment. The configuration configures the user equipment to transmit SON information either: (1) after the user equipment receives SON parameter from another base station, wherein SON information includes SON parameter of another base station; or (2) after a specific period.

Operation S1502 is executed to receive, by the user equipment, the configuration from the base station. Operation S1503 is executed to transmit, by the base station, a paging information to the user equipment after the specific period. The paging information is used for initialing an MT-EDT procedure and includes an indication.

Operation S1504 is executed to receive, by the user equipment, the paging information with the indication from the base station. Operation S1505 is executed to transmit, by the user equipment, a SON information to the base station based on the indication. Operation SI 506 is executed to receive, by the base station, the SON information.

Figure 16:
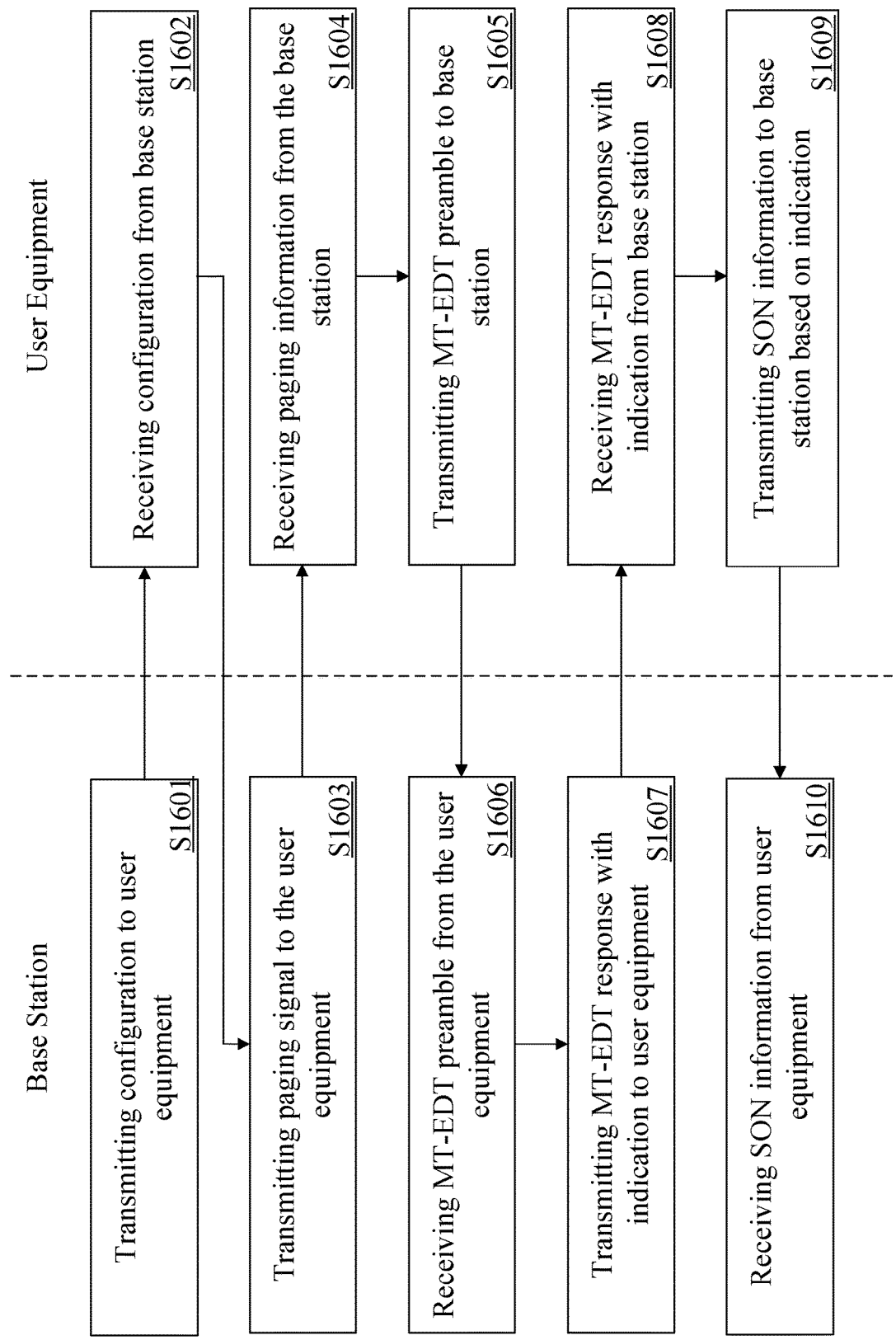
FIG. 16 is a flowchart diagram according to an embodiment of the present disclosure.

Some embodiments of the present disclosure include a SON information transmission method, and flowchart diagram thereof is as shown in FIG. 16. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S1601 is executed to transmit, by the base station, a configuration to the user equipment. The configuration configures the user equipment to transmit SON information either: (1) after the user equipment receives SON parameter from another base station, wherein SON information includes SON parameter of another base station; or (2) after a specific period.

Operation S1602 is executed to receive, by the user equipment, the configuration from the base station. Operation S1603 is executed to transmit, by the base station, a paging information to the user equipment. The paging information is used for initialing an MT-EDT procedure. Operation S1604 is executed to receive, by the user equipment, the paging information from the base station.

Operation S1605 is executed to transmit, by the user equipment, an MT-EDT preamble to the base station after the specific period. Operation S1606 is executed to receive, by the base station, the MT-EDT preamble from the user equipment. Operation S1607 is executed to transmit, by the base station, an MT-EDT response to the user equipment. The MT-EDT response includes an indication. Operation S1608 is executed to receive, by the user equipment, the MT-EDT response with the indication from the base station. Operation S1609 is executed to transmit, by the user equipment, a SON information to the base station based on the indication. Operation S1610 is executed to receive, by the base station, the SON information from the user equipment.

Figure 17A:
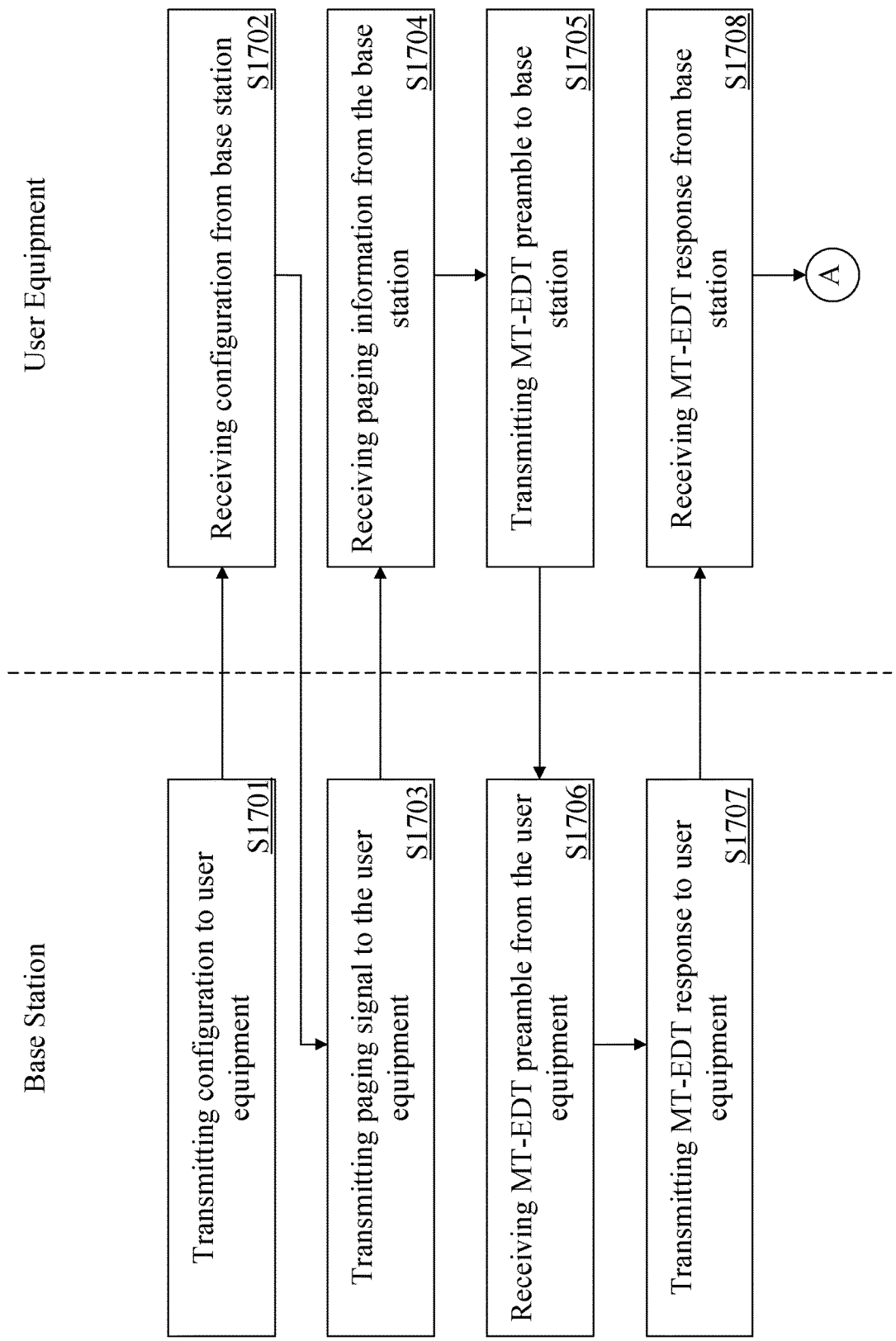
FIGS. 17A to 17B are flowchart diagrams according to an embodiment of the present disclosure.
Figure 17B:
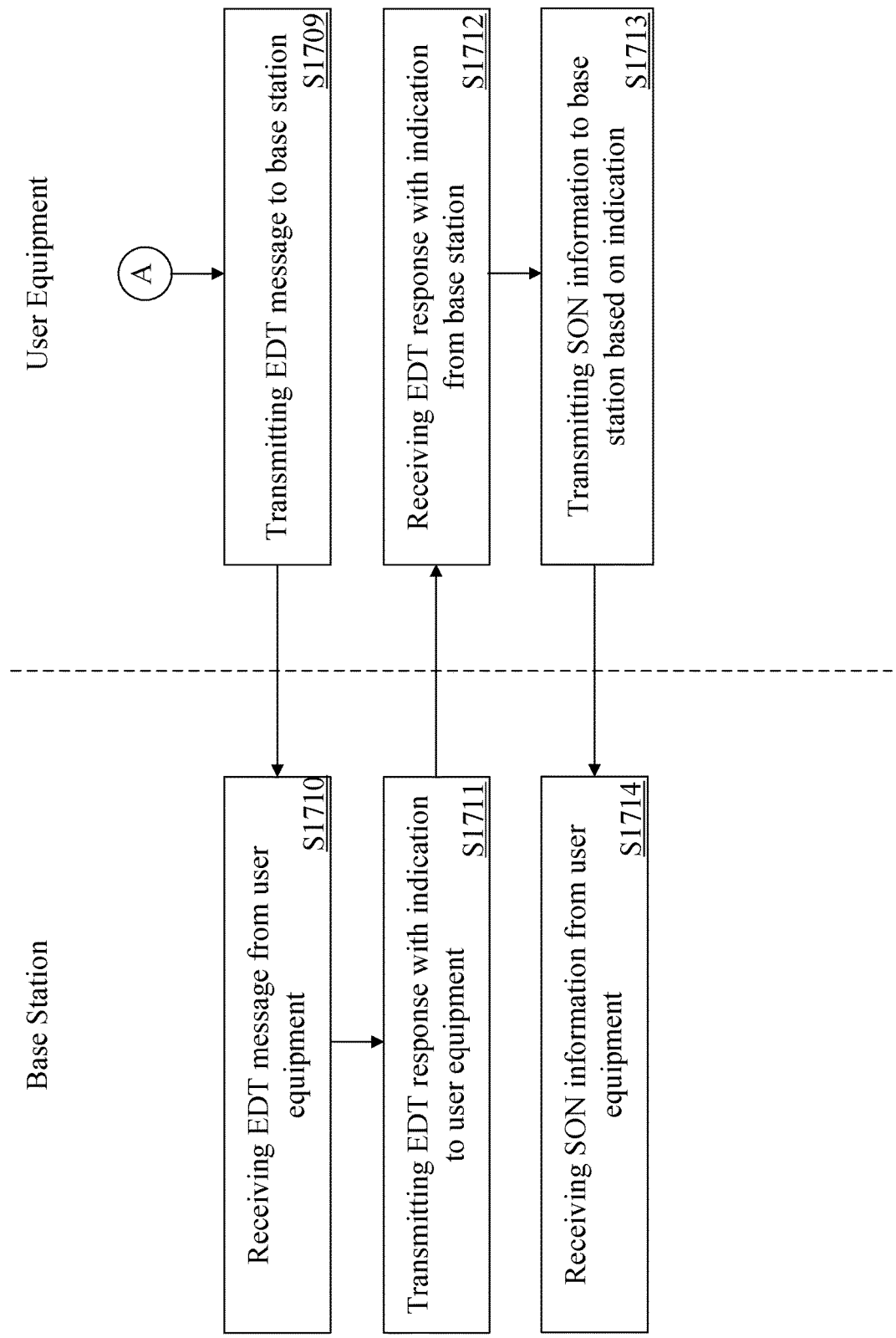

Some embodiments of the present disclosure include a SON information transmission method, and flowchart diagrams thereof are as shown in FIGS. 17A to 17B. The method of some embodiments is for use in a NB-IoT network system (e.g., the NB-IoT network system of the aforesaid embodiments), and the NB-IoT network system includes a user equipment and a base station. Detailed operations of the SON information transmission method are as follows.

Operation S1701 is executed to transmit, by the base station, a configuration to the user equipment. The configuration configures the user equipment to transmit SON information either: (1) after the user equipment receives SON parameter from another base station, wherein SON information includes SON parameter of another base station; or (2) after a specific period.

Operation S1702 is executed to receive, by the user equipment, the configuration from the base station. Operation S1703 is executed to transmit, by the base station, a paging information to the user equipment. Operation S1704 is executed to receive, by the user equipment, the paging information from the base station.

Operation S1705 is executed to transmit, by the user equipment, an MT-EDT preamble to the base station after the specific period. Operation S1706 is executed to receive, by the base station, the MT-EDT preamble from the user equipment. Operation S1707 is executed to transmit, by the base station, an MT-EDT response to the user equipment. Operation S1708 is executed to receive, by the user equipment, the MT-EDT response from the base station. Operation S1709 is executed to transmit, by the user equipment, an EDT message to the base station. Operation S1710 is executed to receive, by the base station, the EDT message from the user equipment.

Operation S1711 is executed to transmit, by the base station, an EDT response to the user equipment. The EDT response includes an indication. Operation S1712 is executed to receive, by the user equipment, the EDT response with the indication. Operation S1713 is executed to transmit, by the user equipment, a SON information to the base station based on the indication. Operation S1714 is executed to receive, by the base station, the SON information from the user equipment.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

Above procedure could also be used in other network, such as Industrial IoT network, 5G network, or future network.

In this document, relational terms such as "first," "second." and the like may be used solely to distinguish one entity or action from another entity or action without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an." or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A self-optimization network information transmission method for a user equipment (UE), the method comprising:
receiving, by the UE, a configuration from a first base station, wherein the configuration comprises an indicator indicating to the UE whether to transmit self-optimization network information to the first base station in response to receiving a corresponding self-optimization network parameter from a second base station or in response to expiration of a timer included in the configuration;
receiving, by the UE, the self-optimization network parameter from the second base station via a broadcast channel of the second base station, wherein the self-optimization network parameter comprises at least one of a global cell identification of the second base station and a physical cell identification of the second base station received from the second base station via the broadcast channel of the second base station;
resuming or establishing a connection between the UE and the first base station;
determining, based at least in part the configuration from the first base station, whether to transmit self-optimization network information in response to receiving a corresponding self-optimization network parameter from the second base station or in response to expiration of a timer included in the configuration; and
transmitting via the connection, by the UE, the self-optimization network information to the first base station in a first early data transmission message, based on the configuration, in response to one of: receiving the self-optimization network parameter from the second base station or expiration of the timer;
wherein:
the configuration is for the UE to transmit the self-optimization network information by:
transmitting the self-optimization network information to the first base station after receiving the self-optimization network parameter from the second base station, wherein the self-optimization network information comprises the self-optimization network parameter of the second base station;
transmitting, in response to self-optimization network information corresponding to the self-optimization network parameter received via the broadcast channel being available or in response to expiration of the timer, the self-optimization network information to the first base station; and
transmitting a second early data transmission message to the first base station with a self-optimization network information available message embedded in the second early data transmission message, the second early data transmission message comprising a mobile-original early data transmission message,
transmitting the self-optimization network information further comprises:
transmitting the self-optimization network information to the first base station based on the configuration and the self-optimization network information available message.

2. The method of claim 1, further comprising performing the following operations before transmitting the self-optimization network information:
receiving, by the UE, a self-optimization network information request from the first base station.

3. The method of claim 1, further comprising:
transmitting, by the UE, the physical cell identification to the first base station.

4. The method of claim 1, wherein resuming or establishing the connection between the UE and the first base station further comprises:
transmitting, by the UE, a random access preamble to the first base station;
receiving, by the UE, a random access response, which corresponds to the random access preamble, from the first base station;
transmitting, by the UE, a radio resource control resume request with a resume identification to the first base station based on the random access response;
receiving, by the UE, a radio resource control resume response, which correspond to the radio resource control resume request with the resume identification, from the first base station; and
establishing, by the UE, a connection with the base station based on the radio resource control resume response.

5. The method of claim 1, wherein the first early data transmission message comprises a mobile-original early data transmission preamble and transmitting the self-optimization network information further comprises:
receiving, by the UE, a mobile-original early data transmission response, which correspond s to the mobile-original early data transmission preamble, from the first base station, wherein the mobile-original early data transmission response comprises an indication; and
transmitting, by the UE, the self-optimization network information to the first base station based on the indication.

6. The method of claim 1, wherein:
the first early data transmission message comprises a mobile-original early data transmission preamble; and
the method further comprises:
transmitting the self-optimization network information further comprises receiving, by the UE, a mobile-original early data transmission response, which corresponds to the mobile-original early data transmission preamble, from the first base station;
transmitting, by the UE, an early data transmission message to the first base station based on the mobile-original early data transmission response; and
receiving, by the UE, an early data transmission response, which corresponds to the early data transmission message, from the first base station, wherein the early data transmission response comprises an indication.

7. The method of claim 1, wherein transmitting the self-optimization network information further comprises:
receiving, by the UE, a paging information from the first base station, wherein the paging information is for mobile-terminated early data transmission and comprises an indication; and
transmitting, by the UE, the self-optimization network information based on the indication.

8. The method of claim 1, wherein transmitting the self-optimization network information further comprises:
receiving, by the UE, a paging information from the first base station;
transmitting, by the UE, a mobile-terminated early data transmission preamble to the first base station based on the paging information;
receiving, by the UE, a mobile-terminated early data transmission response, which corresponds to the mobile-terminated early data transmission preamble, from the first base station, wherein the mobile-terminated early data transmission response comprises an indication; and transmitting, by the UE, the self-optimization network information to the first base station based on the indication.

9. The method of claim 1, wherein transmitting the self-optimization network information further comprises:
receiving, by the UE, a paging information from the first base station;
transmitting, by the UE, a mobile-terminated early data transmission preamble to the first base station based on the paging information;
receiving, by the UE, a mobile-terminated early data transmission response, which corresponds to the mobile-terminated early data transmission preamble, from the first base station;
transmitting, by the UE, an early data transmission message to the first base station based on the mobile-terminated early data transmission response;
receiving, by the UE, an early data transmission response, which corresponds to the early data transmission message, from the first base station, wherein the early data transmission response comprises an indication; and
transmitting, by the UE, the self-optimization network information to the first base station based on the indication.

10. The method of claim 1, wherein the configuration is further for the UE to transmit the self-optimization network information as one of:
transmitting the self-optimization network information to the first base station based on the timer, wherein transmitting the self-optimization network information is triggered by the expiration of the timer; and
transmitting the self-optimization network information to the first base station based on the indicator, wherein transmitting the self-optimization network information is notified by the indicator.

11. The method of claim 1, wherein the self-optimization network information comprises at least one of a random access parameter of the UE, a radio link failure parameter of the UE and the self-optimization network parameter.

12. The method of claim 1, wherein the mobile-original early data transmission message comprises a Mobile-Originated Message 3.

13. The method of claim 5, wherein the indication indicates to embed the self-optimization network information in the first early data transmission message.

14. A self-optimization network information transmission method for a first base station, the first base station being for communicating with a user equipment (UE) used in an internet of things network system, the method comprising:
transmitting, by the first base station, a configuration to the UE, wherein the configuration comprises an indicator indicating to the UE whether to transmit self-optimization network information to the first base station in response to receiving a corresponding self-optimization network parameter from a second base station or in response to expiration of a timer included in the configuration;
resuming or establishing a connection between the UE and the first base station; and
receiving via the connection, by the first base station, a self-optimization network information from the UE in a first early data transmission message, based on the configuration, in response to a selection by the UE based at least in part on the indicator, the selection comprising at least one of: receiving the self-optimization network parameter from the second base station or expiration of the timer, wherein the self-optimization network parameter comprises at least one of a global cell identification of the second base station and a physical cell identification of the second base station received from the second base station via a broadcast channel of the second base station;
wherein:
the configuration is for the UE to transmit the self-optimization network information by:
transmitting the self-optimization network information to the first base station after receiving a self-optimization network parameter from the second base station, wherein the self-optimization network information comprises the self-optimization network parameter of the second base station;
transmitting, in response to self-optimization network information corresponding to the self-optimization network parameter being available or in response to expiration of the timer, the self-optimization network information to the first base station; and
transmitting a second early data transmission message to the first base station with a self-optimization network information available message embedded in the second early data transmission message, the second early data transmission message comprising a mobile-original early data transmission message; and
transmitting the self-optimization network information further comprises:
transmitting the self-optimization network information to the first base station based on the configuration and the self-optimization network information available message.

15. A user equipment (UE) for use in an internet of things (IoT) network, the UE comprising:
a memory; and
at least one processor coupled with the memory and configured to cause the UE to:
receive a configuration from a first base station, wherein the configuration comprises an indicator indicating to the UE whether to transmit self-optimization network information to the first base station in response to receiving a corresponding self-optimization network parameter from a second base station or in response to expiration of a timer included in the configuration;
receive the self-optimization network parameter from the second base station via a broadcast channel of the second base station, wherein the self-optimization network parameter comprises at least one of a global cell identification of the second base station and a physical cell identification of the second base station received from the second base station via the broadcast channel of the second base station;
resume or establish a connection between the UE and the first base station;
determine, based at least in part the configuration from the first base station, whether to transmit self-optimization network information in response to receiving a corresponding self-optimization network parameter from the second base station or in response to expiration of a timer included in the configuration; and transmit, via the connection, the self-optimization network information to the first base station in a first early data transmission message, based on the configuration, in response to one of: receiving the self-optimization network parameter from the second base station or expiration of the timer, by:
   transmitting the self-optimization network information to the first base station after receiving the self-optimization network parameter from the second base station, wherein the self-optimization network information comprises the self-optimization network parameter of the second base station;
   transmitting, in response to self-optimization network information corresponding to the self-optimization network parameter received via the broadcast channel being available or in response to expiration of the timer, the self-optimization network information to the first base station; and
   transmitting a second early data transmission message to the first base station with a self-optimization network information available message to the first base station embedded in the second early data transmission message, the second early data transmission message comprising a mobile-original early data transmission message,
wherein transmitting the self-optimization network information further comprises:
   transmitting the self-optimization network information to the first base station based on the configuration and the self-optimization network information available message.

16. The UE of claim 15, wherein the at least one processor is further configured to cause the UE to:
receive a self-optimization network information request from the first base station; and
transmit the self-optimization network information to the first base station based on the configuration and the self-optimization network information request.

17. The UE of claim 15, wherein the at least one processor is further configured to cause the UE to:
transmit the physical cell identification to the first base station.

18. The UE of claim 15, wherein the at least one processor is further configured to cause the UE to:

transmit a random access preamble to the first base station;
receive a random access response, which corresponds to the random access preamble, from the first base station;
transmit a radio resource control resume request with a resume identification to the first base station based on the random access response;
receive a radio resource control resume response, which correspond to the radio resource control resume request with the resume identification, from the first base station; and
establish a connection with the base station based on the radio resource control resume response.

19. The UE of claim 15, wherein the first early data transmission message comprises a mobile-original early data transmission preamble and the at least one processor is further configured to cause the UE to:
receive a mobile-original early data transmission response, which correspond s to the mobile-original early data transmission preamble, from the first base station, wherein the mobile-original early data transmission response comprises an indication; and
transmit the self-optimization network information to the first base station based on the indication.

20. The UE of claim 15, wherein the at least one processor is further configured to cause the UE to:
transmit a mobile-original early data transmission preamble to the first base station;
receive a mobile-original early data transmission response, which corresponds to the mobile-original early data transmission preamble, from the first base station;
transmit an early data transmission message to the first base station based on the mobile-original early data transmission response;
receive an early data transmission response, which corresponds to the early data transmission message, from the first base station, wherein the early data transmission response comprises an indication; and
transmit the self-optimization network information to the first base station based on the indication.

* * * * *